US006385331B2

(12) United States Patent
Harakawa et al.

(10) Patent No.: US 6,385,331 B2
(45) Date of Patent: *May 7, 2002

(54) HAND POINTING DEVICE

(75) Inventors: Kenichi Harakawa; Kenichi Unno; Norio Igawa, all of Chiba-ken (JP)

(73) Assignee: Takenaka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,436

(22) Filed: Mar. 18, 1998

(30) Foreign Application Priority Data

Mar. 21, 1997 (JP) .............................. 9-068602
Dec. 29, 1997 (JP) .............................. 9-369628

(51) Int. Cl.[7] ................................. G06K 9/00
(52) U.S. Cl. ....................... 382/106; 345/156
(58) Field of Search ................. 345/137, 158, 345/156, 157, 355, 329, 358, 173, 330, 331; 434/45; 382/291, 106, 107, 105, 203, 294, 295, 279; 710/74; 178/18.01, 18, 19; 600/595; 395/2.8; 364/410; 351/210; 356/34

(56) References Cited

U.S. PATENT DOCUMENTS

| 5,038,258 A | | 8/1991 | Koch et al. ................ 362/237 |
| 5,616,078 A | * | 4/1997 | Oh .............................. 463/8 |
| 5,900,863 A | * | 5/1999 | Numazaki ................... 345/158 |

FOREIGN PATENT DOCUMENTS

| DE | 41 42 614 | | 4/1993 | ............ G06K/9/20 |
| JP | 4-74285 | | 3/1992 | ............ G06F/15/70 |
| JP | 4-271423 | | 9/1992 | ............ G06F/3/03 |
| JP | 5-19957 | | 1/1993 | ............ G06F/3/033 |
| JP | 5-324181 | | 12/1993 | ............ G06F/3/033 |
| JP | 07160412 | * | 6/1995 | ............ G06F/3/033 |
| JP | 8-328735 | | 12/1996 | ............ G06F/3/033 |
| JP | 8-329222 | | 12/1996 | ............ G06T/1/00 |

OTHER PUBLICATIONS

Massaki Fukumoto, Yasuhito Suenaga and Kenji Mase; "Finger Pointer: Pointing Interface by Image Processing"; Computers & Graphics, vol. 18, No. 5, pp633–642, Sep. 1994.*

Masaaki Fukumoto et al: "Finger–Pointer: Pointing Interface by Image Processing" Computers and Graphics, GB, Pergamon Press Ltd. Oxford, vol. 18, No. 5, Sep. 1, 1994 pp. 633–642, XP000546603 ISSN: 0097–8493.

English Abstracts of JP08 328735 A and JP 08 329222 A.

Copy of Japanese Office Action Mailed Oct. 23, 2000 and the English Translation Thereof English Language Abstract of Japanese Patent Appln. No. 4–74285.

* cited by examiner

*Primary Examiner*—Samir Ahmed
(74) *Attorney, Agent, or Firm*—Michael D. Bednarek; Shaw Pittman LLP

(57) ABSTRACT

Over an information input space to which an information inputting person comes, a pair of near-infrared light illuminators are arranged in such a manner that the illumination ranges thereof are adjusted so as to illuminate the information inputting person from different directions. A pair of near-infrared-light-sensitive video cameras are also arranged in different positions so as to correspond to the illuminators. The image pickup range of the video cameras is adjusted so that it is out of the range on the floor surface illuminated by the corresponding illuminator, while the information inputting person is within the image pickup range. A controller allows one illuminator at a time to be switched on/off. An image of the information inputting person is picked up by the video camera corresponding to the switched-on illuminator. The information inputting person is extracted based on the images picked up by the video cameras, whereby the position or direction pointed to by the information inputting person is determined.

25 Claims, 24 Drawing Sheets

F I G. 2
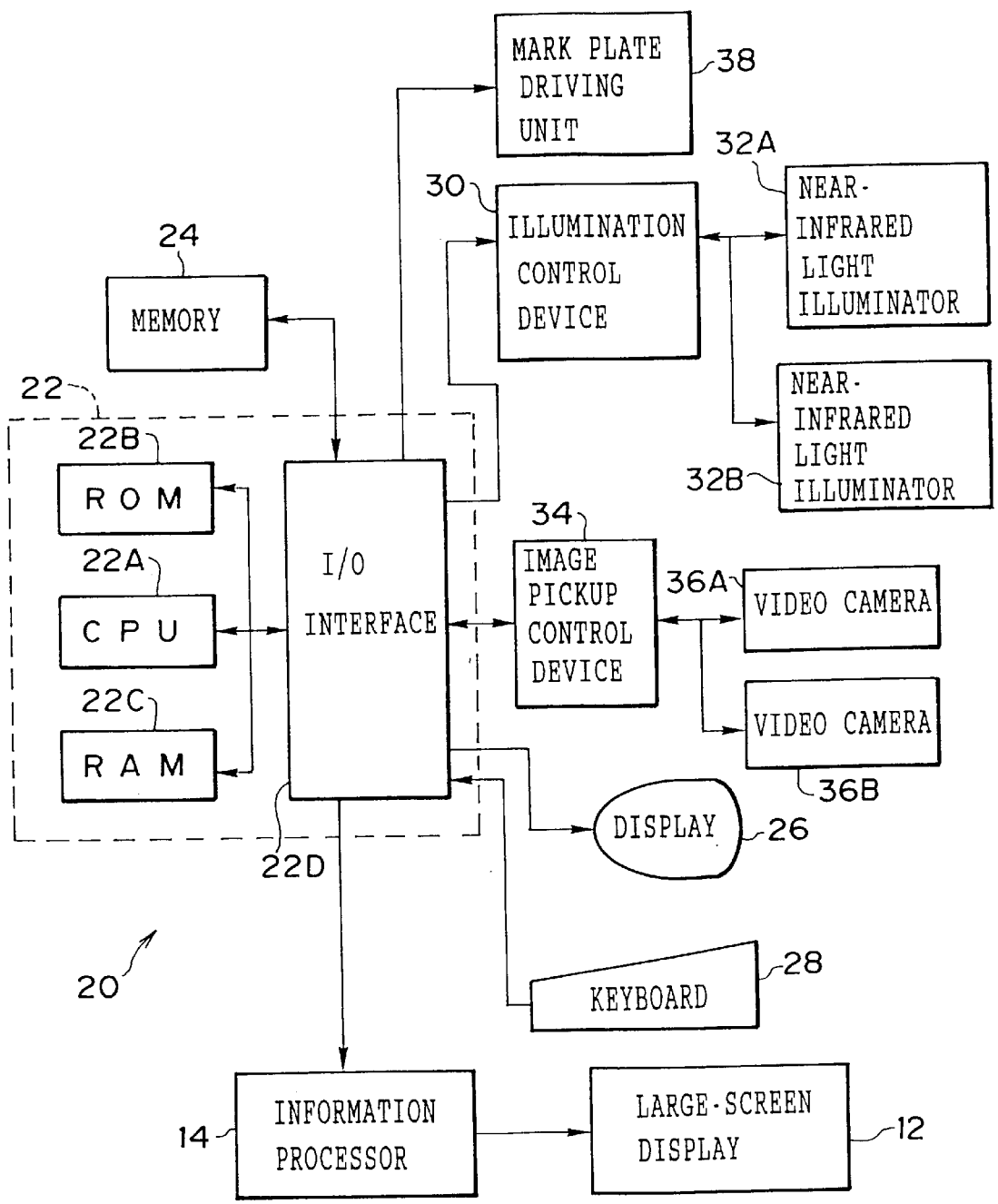

F I G. 6
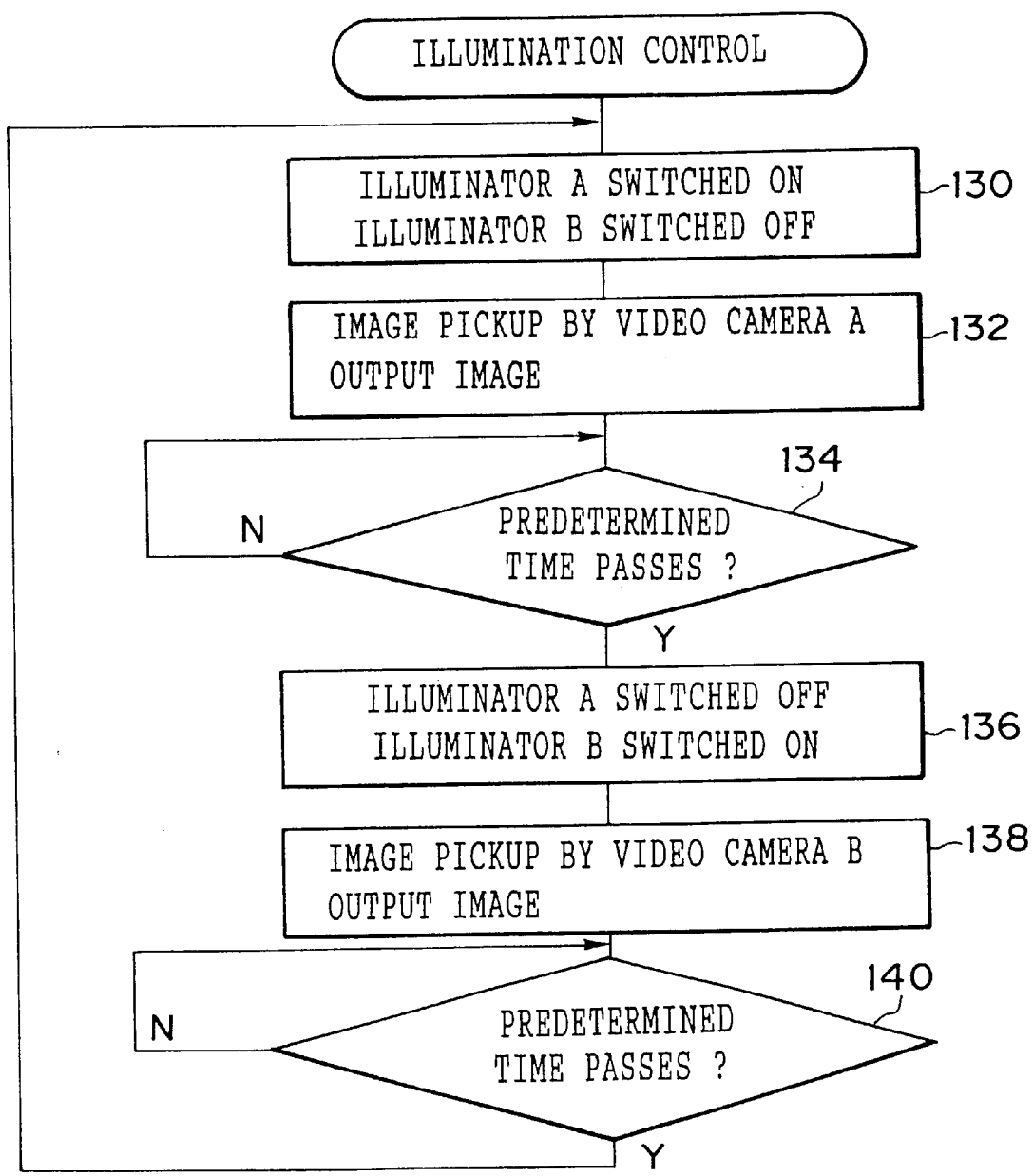

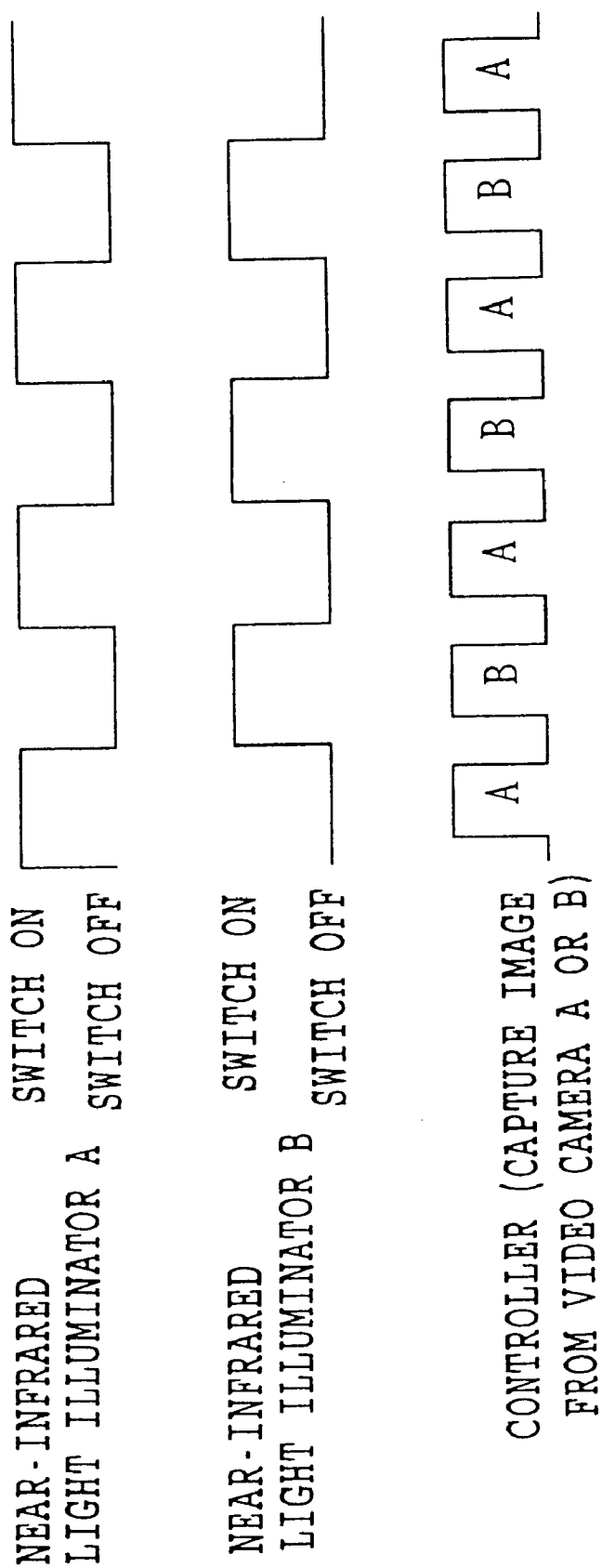

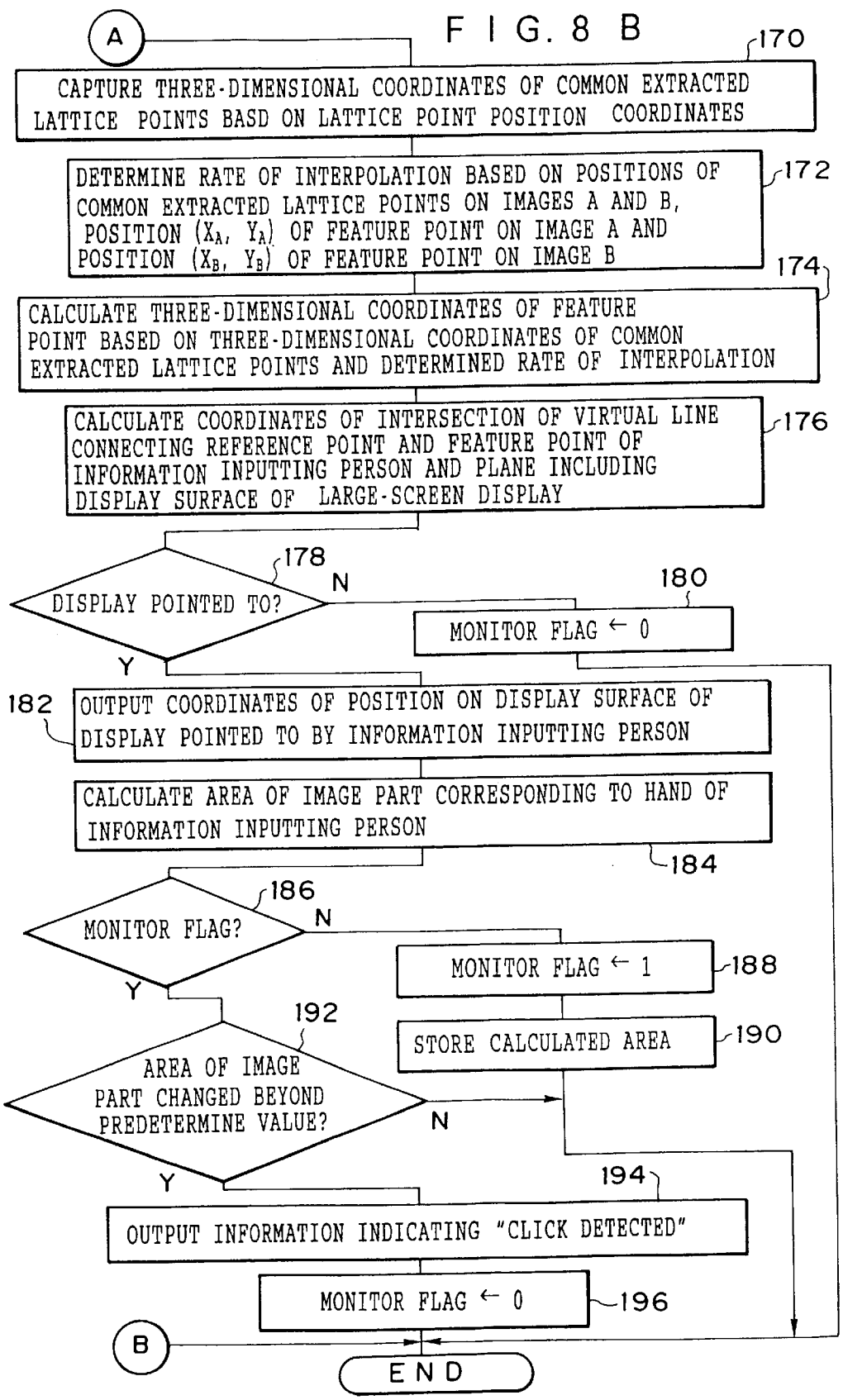

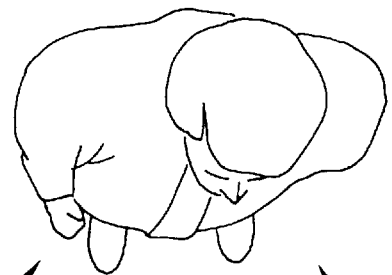
F I G. 1 2 A
F I G. 1 2 B
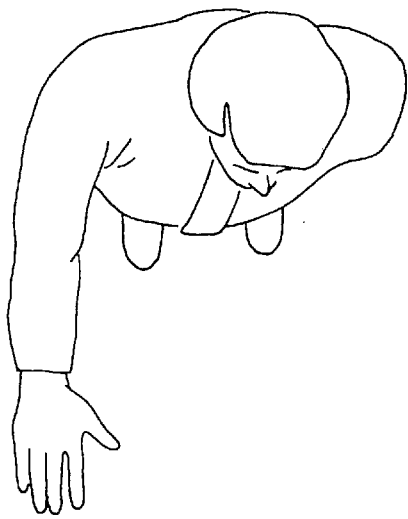
F I G. 1 2 C
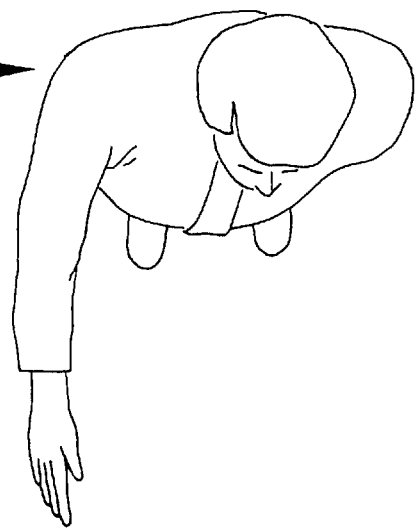

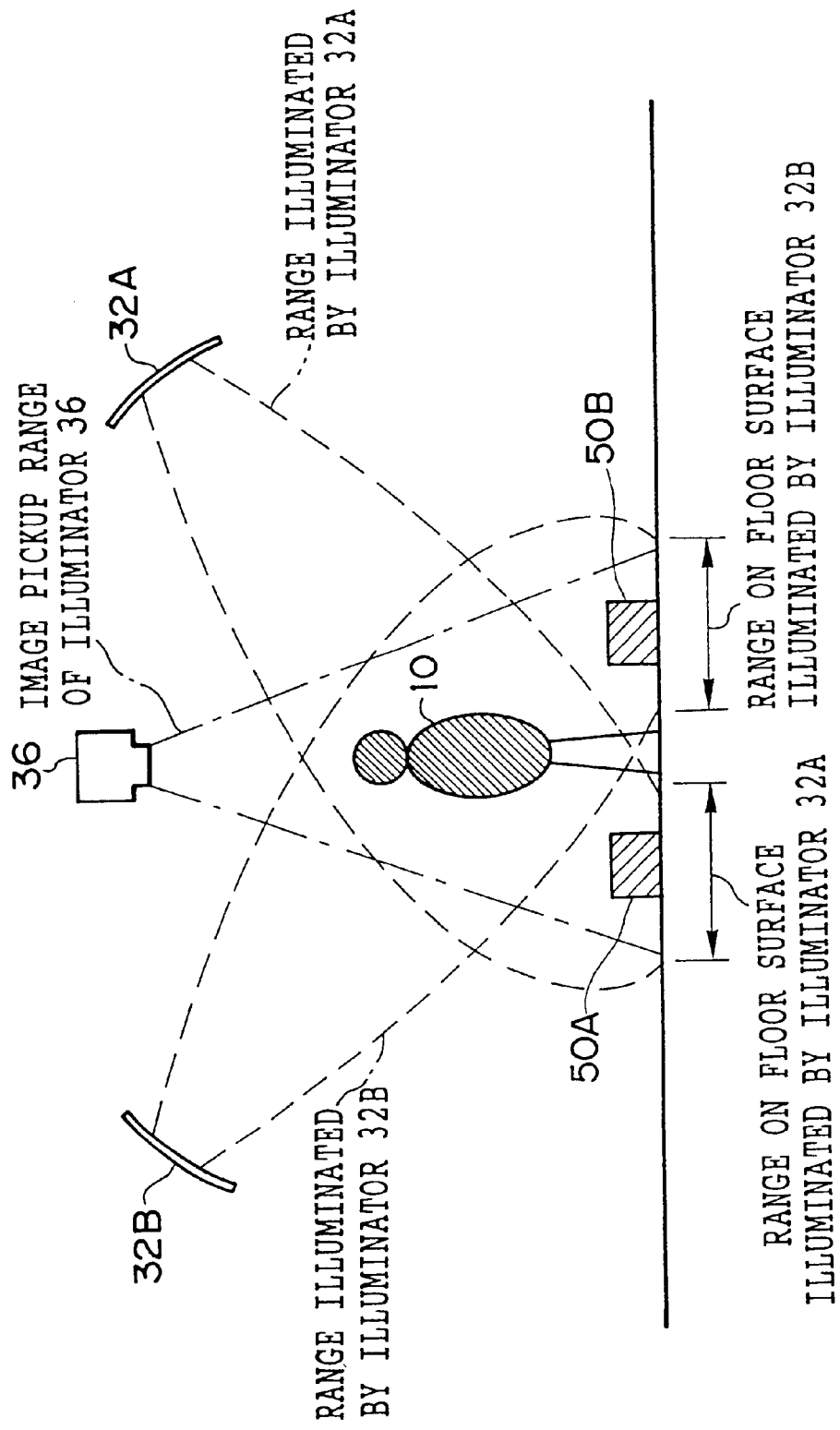

F I G. 2 1
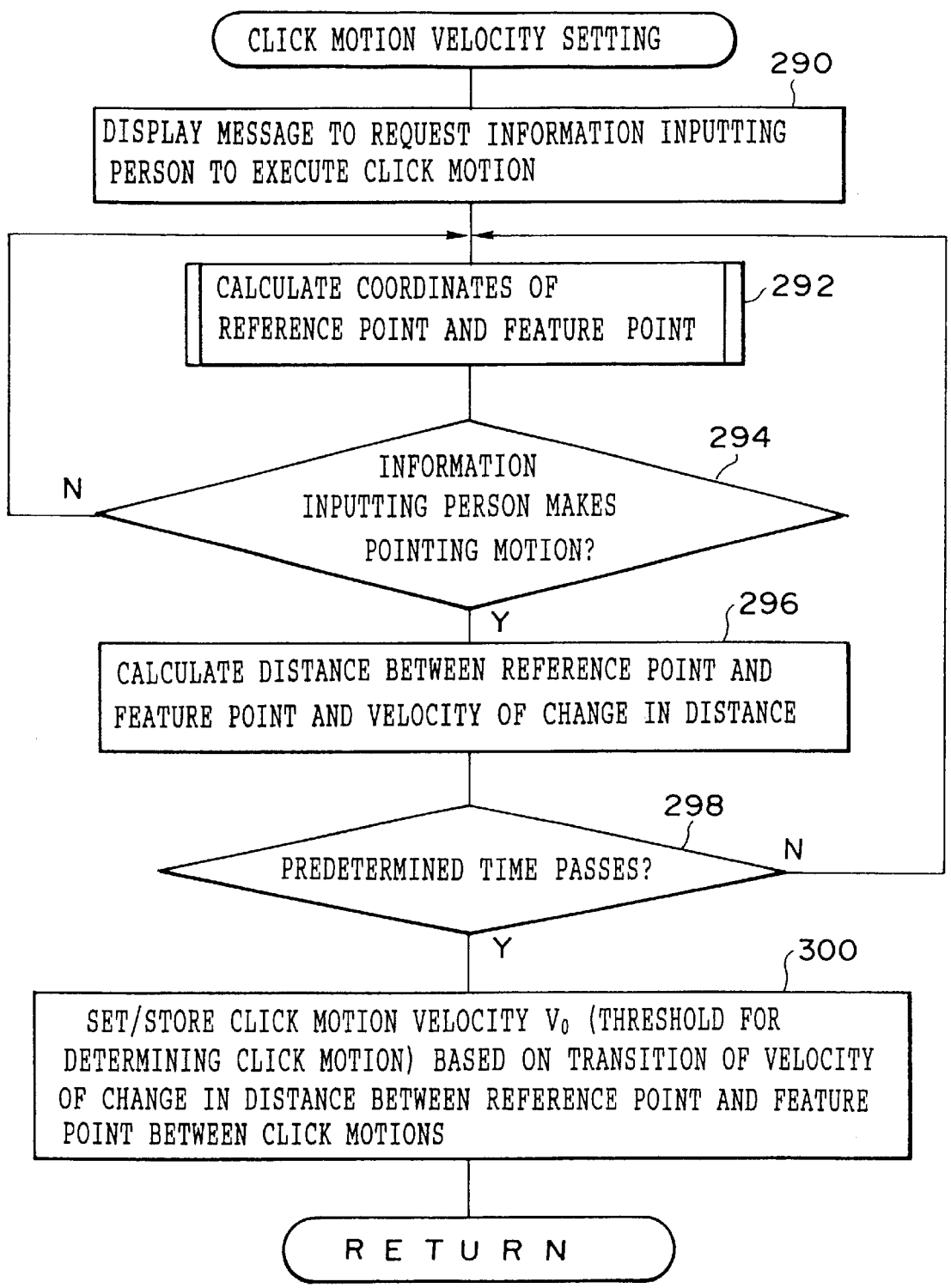

F I G. 2 2 A
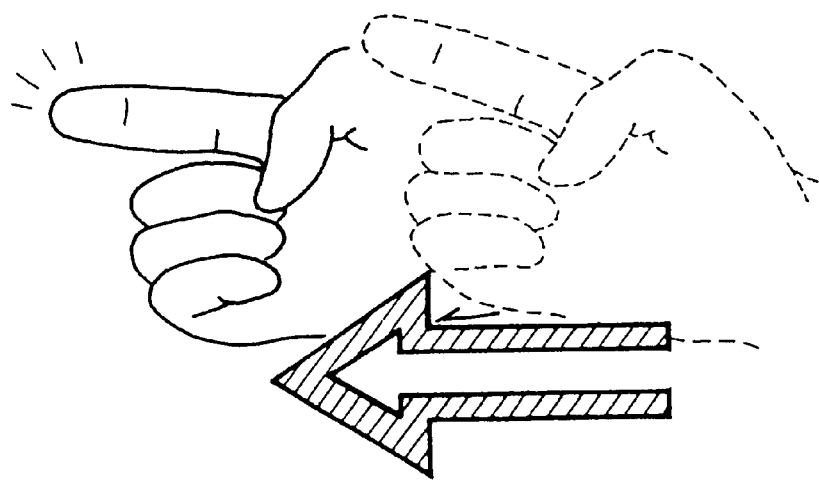
F I G. 2 2 B
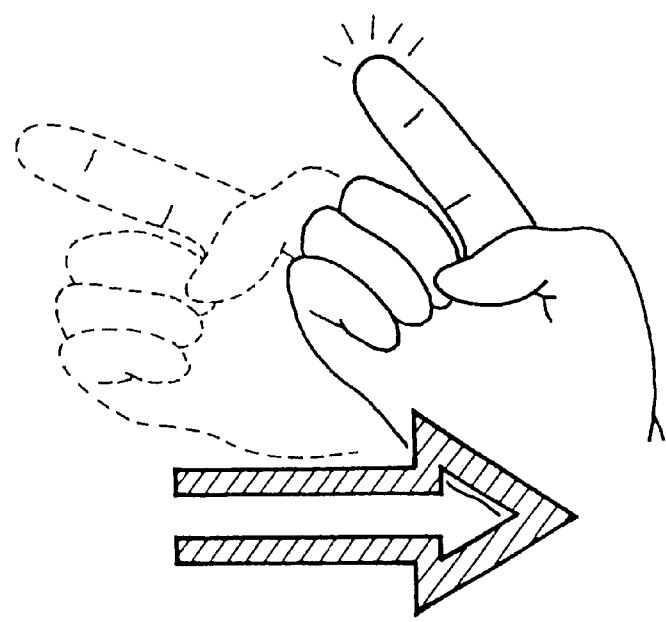

HAND POINTING DEVICE

BACKGROUND OF THE INVENTION

1. Field of the Invention

The present invention relates to a hand pointing apparatus, and more specifically to a hand pointing apparatus for picking up a person to be recognized and for determining a position or a direction pointed to by the person to be recognized.

2. Description of the Related Art

There has been heretofore known a hand pointing input apparatus which comprises a display for displaying predetermined information, an illuminating device for illuminating an information inputting person who comes to the display, and a plurality of image pickup devices for picking up the image of the approaching information inputting person from different directions, wherein a plurality of image pickup devices image pickup images of situations where the approaching information inputting person points with a finger or the like to an optional position on the display, the information inputting person is recognized in accordance with a plurality of images obtained by the image pickup, the position on the display pointed to by the information inputting person is determined, a cursor or the like is displayed on the position pointed to on the display, and the position on the display pointed to is recognized as being clicked at the time of detecting the fact that the information inputting person has performed a clicking action by raising a thumb, whereby a predetermined processing is performed (see, for example, Japanese Patent Application Laid-open (JP-A) Nos. 4-271423, 5-19957, 5-324181 or the like).

According to the above-described hand pointing input apparatus, since the information inputting person can give various instructions to an information processing apparatus and input various information to the information processing apparatus without touching an input device such as a keyboard or a mouse, it is possible to simplify the operation for using the information processing apparatus.

However, in an environment where the hand pointing input apparatus is actually operated, an object which is not a subject to be recognized, for example, the luggage of the information inputting person or trash, may exist around the information inputting person who is the subject to be recognized. The surroundings of the information inputting person are also illuminated by an illuminating light emitted from the illuminating device. Thus, if the above-described object which is not the subject to be recognized exists around the information inputting person, this object which is not the subject to be recognized is present as a high-luminance object in the images picked up by the image pickup device. Thus, there is a high possibility that an object which is not the subject to be recognized, is recognized as the information inputting person by mistake.

In order to avoid this wrong recognition of the information inputting person, it is necessary to improve the accuracy of the recognition of the information inputting person. For example, it is necessary to perform a complicated image processing such as the total recognition of the information inputting person by the use of a plurality of image features in addition to the luminance (for example, pattern matching or the like based on the subject is outline which is one of the image features). Therefore, since a heavy load is applied to the image processor for performing the image processing such as the recognition based on the picked-up images, this causes a long time to be taken until the instruction from the information inputting person can be determined. In order to reduce the time required for the determination of the instruction from the information inputting person, it is necessary to use an image processor with a higher processing speed. This causes the problem of the cost of the apparatus increasing.

Furthermore, a three-dimensional coordinate of a feature point has been heretofore determined by a calculation from the position of the feature point of the information inputting person on the picked-up image (for example, a tip of his/her forefinger or the like) so as to thereby determine the position on the display pointed to by the information inputting person. However, the calculation processing for determining the three-dimensional coordinate of the feature point is complicated. Due to this fact, a long time is required for the determination of the instruction from the information inputting person in the same manner as the above-described case.

Moreover, a motion raising the thumb has been heretofore predefined as representing a clicking action, and the motion of raising the thumb alone has been thus detected as the clicking. However, the degree of freedom of movement is low, which disadvantageously causes less ease-of-use. On the other hand, if motions other than the motion of raising the thumb are detected as the clicking, the processing to detect the clicking becomes complicated, causing a disadvantageously, long time to be taken before the clicking is detected.

SUMMARY OF THE INVENTION

The present invention was completed in consideration of the above facts. It is a first object of the present invention to provide a hand pointing apparatus having a simple construction and being capable of reducing the time required for the determination of an instruction from a person to be recognized.

It is a second object of the present invention to provide a hand pointing apparatus capable of improving the degree of freedom of the movement which the person to be recognized makes in order to give the instruction, without spending a long time in the determination of the instruction from the person to be recognized.

In order to achieve the above described objects, a hand pointing apparatus according to a first aspect of the present invention comprises: illuminating means for illuminating a person to be recognized; a plurality of image pickup means, located in different positions wherein the image pickup range is adjusted for each image so that the person to be recognized who is illuminated by the above-described illuminating means, may be within the image pickup range, and an illuminated range on a floor surface, which is illuminated by the above-described illuminating means, may be out of the image pickup range; and determining means for extracting an image part corresponding to the person to be recognized from a plurality of images based on a plurality of images of situations picked up by the plurality of image pickup means, the situations being indicative of the person to be recognized pointing to either a specific position or a specific direction, and for determining either the position or the direction pointed to by the person to be recognized.

In the first aspect of the present invention, the person to be recognized may point to a specific position on, for example, the surface of a display screen or the like of a display, or may point to a specific direction (for example, the direction in which a specific object exists as seen from the person to be recognized). The determining means extracts the image part corresponding to the person to be recognized from a plurality of images based on a plurality of images of situations picked up by the plurality of image pickup means, where the situations are indicative of the person to be recognized pointing to either the specific position or the specific direction, and the determining means determines either the position or the direction pointed to by the person to be recognized. By calculating a three-dimensional coordinate of a feature point of the person to be recognized (a point whose position is changed in response to the motion by the person to be recognized to point to a specific position or a specific direction, for example, a tip of a predetermined part, (for example, the hand, the finger, or the like), of the body of the person to be recognized making the pointing motion, the tip of a pointer held by the person to be recognized or the like), the determination of the specific position or direction pointed to can be accomplished based on the position of the person to be recognized and the three-dimensional coordinates of the feature point.

In the first aspect of the present invention, the image pickup range of a plurality of pickup means is adjusted so that the person to be recognized, who is illuminated by the illuminating means, may be within the image pickup range, and the illuminated range on the floor surface which is illuminated by the illuminating means, may be out of the image pickup range. Thus, even if an object which is not a subject to be recognized such as luggage or and a trash exists on the floor surface around the person to be recognized while the person to be recognized is illuminated, the possibility that this object which is not the subject to be recognized comes within the image pickup range of the image pickup means is reduced. Furthermore, even if the object which is not the subject to be recognized comes within the image pickup range, the object is not illuminated by the illuminating means and its luminance is thus reduced. Thus, there is little possibility of the image part corresponding to the object which is not the subject to be recognized existing in the image picked up by the image pickup means. Even if the image part corresponding to the object which is not the subject to be recognized exists, the luminance of the image part is reduced.

Thus, in an extraction of the image part corresponding to the person to be recognized by the determining means, it is possible to extract the image part corresponding to the person to be recognized in a short time by a simple processing without a complicated image processing. Therefore, it is possible to reduce the time required for the determination of the instruction from the person to be recognized without the use of an image processor or the like having a high processing speed and a complicated construction.

As described above, according to the first aspect of the present invention, the image pickup range of a plurality of image pickup means is adjusted so that the person to be recognized, who is illuminated by the illuminating means, may be within the image pickup range, and the illuminated range on the floor surface which is illuminated by the illuminating means, may be out of the image pickup range. Thus, an effect is obtained in which it is possible to provide a hand pointing apparatus of a simple construction whereby the time required for the determination of the instruction from the person to be recognized is reduced.

A hand pointing apparatus according to a second aspect of the present invention comprises: a plurality of illuminating means for illuminating a person to be recognized from different directions; a plurality of image pickup means, located in different positions corresponding to each of the plurality of illuminating means, wherein an image pickup range is adjusted so that the person to be recognized, who is illuminated by the corresponding illuminating means, may be within the image pickup range, and the illuminated range on a floor surface, which is illuminated by the corresponding illuminating means, may be out of the image pickup range; controlling means for switching on/off the plurality of illuminating means one by one in sequence, and for controlling so as to image pickup the person to be recognized pointing to either a specific position or a specific direction by the image pickup means corresponding to the switched-on illuminating means; and determining means for extracting an image part corresponding to the person to be recognized from a plurality of images based on a plurality of images picked up by the plurality of image pickup means, and for determining either the position or the direction pointed to by the person to be recognized.

The second aspect of the present invention is provided with a plurality of illuminating means for illuminating the person to be recognized from different directions. The plurality of image pickup means are located in different positions corresponding to a plurality of illuminating means. The image pickup range of the plurality of image pickup means is adjusted so that the person to be recognized, who is illuminated by the corresponding illuminating means, may be within the image pickup range, and the illuminated range on the floor surface, which is illuminated by the corresponding illuminating means, may be out of the image pickup range. Thus, as described in the first aspect of the present invention, even if an object which is not the subject to be recognized, such as luggage or trash, exists on the floor surface around the person to be recognized, the possibility that this object which is not the subject to be recognized comes within the image pickup range of the image pickup means is reduced. Even if this object comes within the image pickup range of the image pickup means, the luminance of the picked-up image is reduced.

The controlling means switches on/off a plurality of illuminating means one by one in sequence, and controls so as to pickup the images of the person to be recognized pointing to either a specific position or a specific direction by the image pickup means corresponding to the switched-on illuminating means, whereby the picked-up images are output from each of the image pickup means. Thus, even if an object which is not the subject to be recognized comes within the image pickup range, the image pickup is performed by the image pickup means at low luminance.

The determining means extracts the image part corresponding to the person to be recognized from a plurality of images based on a plurality of images output by a plurality of image pickup means, and then it determines either the position or the direction indicated by the person to be recognized. Thus, in the same manner as the first aspect of the present invention, there is little possibility that the image part corresponding to the object which is not the subject to be recognized exists. Even if this image part exists, the image part corresponding to the person to be recognized is extracted in accordance with a plurality of images whose luminance is low. Thus, it is possible to extract the image part corresponding to the person to be recognized in a short time by a simple processing without perfoming complicated image processing.

Therefore, the effect is obtained in which it is possible to provide the hand pointing apparatus wherein the time required for the determination of the instruction from the person to be recognized is reduced, without using an image processor or the like having a high processing speed and a complicated construction.

A hand pointing apparatus according to a third aspect of the present invention comprises: a plurality of illuminating means for illuminating a person to be recognized from different directions; at least one image pickup means for picking up the image of the person to be recognized, who is illuminated by the illuminating means; discriminating means for switching on/off the plurality of illuminating means one by one in sequence, for comparing a plurality of images of the person to be recognized pointing to either a specific position or a specific direction picked up by the same image pickup means during the switching on of the plurality of illuminating means, and for discriminating between an image part corresponding to the person to be recognized and an image part other than the image part corresponding to the person to be recognized in the plurality of images for at least one image pickup means; and determining means for extracting the image part corresponding to the person to be recognized from the plurality of images picked up by the image pickup means based on a result of a discrimination by the discriminating means, and for determining either the position or the direction pointed to by the person to be recognized.

The discriminating means of the third aspect of the present invention switches on/off a plurality of illuminating means one by one in sequence, compares a plurality of images of the person to be recognized pointing to either a specific position or a specific direction picked up by the same image pickup means during the switching on of a plurality of illuminating means, and discriminates between the image part corresponding to the person to be recognized and the image part other than the image part corresponding to the person to be recognized in a plurality of images for at least one image pickup means.

Since a plurality of illuminating means illuminate the person to be recognized from different directions, the luminance is always high in the image part corresponding to the person to be recognized in a plurality of images picked up by the same image pickup means during the switching on of a plurality of illuminating means. The luminance is thus considerably varied in the image part corresponding to the objects which are not the subject to be recognized such as luggage and trash on the floor surface around the person to be recognized, depending on the direction of the illumination during the image pickup. Therefore, by a very simple processing to compare the luminance of the image parts in the images to each other over a plurality of images (for example, to compare average values or minimum values of the luminance in each image part), it is possible to discriminate between the image part corresponding to the person to be recognized and the image part other than the image part corresponding to the person to be recognized in a plurality of images.

The determining means extracts the image part corresponding to the person to be recognized from the plurality of images picked up by the image pickup means based on the result of the discrimination by the discriminating means, and determines either the position or the direction pointed to by the person to be recognized. Therefore, it is possible to extract the image part corresponding to the person to be recognized in a short image by a simple processing without performing complicated image processing. It is also possible to reduce the time required for determining an instruction from the person to be recognized without the use of an image processor or the like having a high processing speed and a complicated construction.

A hand pointing apparatus according to a fourth aspect of the present invention comprises: illuminating means for illuminating a person to be recognized; a plurality of image pickup means for picking up the image of the person to be recognized, who is illuminated by the illuminating means from different directions; determining means for extracting an image part corresponding to the person to be recognized from a plurality of images based on a plurality of images of situations picked up by the plurality of image pickup means, the situations being indicative of the person to be recognized pointing to either a specific position or a specific direction, and for determining either the position or the direction pointed to by the person to be recognized; and preventing means for preventing an object which is not the subject to be recognized from remaining on the floor surface around the person to be recognized.

The fourth aspect of the present invention is provided with the preventing means for preventing an object which is not the subject to be recognized from remaining on the floor surface around the person to be recognized. Since this prevents the object which is not the subject to be recognized from remaining around the person to be recognized, it is possible to prevent the image part corresponding to the object which is not the subject to be recognized from existing in the images picked up by the image pickup means. The determining means extracts the image part corresponding to the person to be recognized based on a plurality of images obtained by the image pickup means, and determines either the position or the direction pointed to by the person to be recognized. Thus, it is possible to extract the image part corresponding to the person to be recognized in a short time by a processing without performing complicated image processing. It is therefore possible to reduce the time required for determining an instruction from the person to be recognized without the use of an image processor or the like having a high processing speed and a complicated construction.

For example, an inclined surface (slope) formed on the floor surface around the person to be recognized can be used as the preventing means. Thus, even if a relatively large object which is not the subject to be recognized (for example, the luggage of the person to be recognized) is placed around the person to be recognized, the object which is not the subject to be recognized slides down on the inclined surface. Thus, it is possible to prevent an object which is not the subject to be recognized, such as the luggage of the person to be recognized, from being placed around the person to be recognized.

Air flow generating means such as a fan for generating an air flow around the person to be recognized may be also applied as the preventing means. Thus, since a relatively small object which is not the subject to be recognized (for example, small trash, dust or the like) is blown away by the generated air flow, it is possible to prevent the object which is not the subject to be recognized such as small trash from remaining around the person to be recognized. A storage tank for storing water or the like around the person to be recognized may be also arranged as the preventing means. Furthermore, this storage tank may be circular in shape so that the water or the like may circulate through the storage tank, whereby it may be used as the preventing means.

According to the fourth aspect of the present invention, since there is provided a preventing means for preventing an object which is not the subject to be recognized from remaining on the floor surface around the person to be recognized, the effect is obtained in which it is possible to provide a hand pointing apparatus of simple construction wherein the time required for the determination of an instruction from the person to be recognized is reduced.

A hand pointing apparatus according to a fifth aspect of the present invention comprises: illuminating means for illuminating a person to be recognized who arrives at a predetermined place; a plurality of image pickup means for picking up the image of the person to be recognized, who is illuminated by the illuminating means from different directions; storing means for storing information for corresponding the three-dimensional coordinates of a plurality of virtual points positioned near the predetermined place, to the positions of the plurality of virtual points on the plurality of images picked up by the plurality of image pickup means; and determining means: for extracting an image part corresponding to the person to be recognized from a plurality of images based on a plurality of images of situations picked up by the plurality of image pickup means, the situations being indicative of the person to be recognized pointing to either a specific position or a specific direction; for determining the position of a feature point of the person to be recognized in each of the images; for determining the three-dimensional coordinate of the feature point based on the determined position of the feature point and the information stored in the storing means; and for determining either the position or the direction pointed to by the person to be recognized based on the determined three-dimensional coordinates of the feature point.

In the fifth aspect of the present invention, the storing means stores therein the information for corresponding the three-dimensional coordinates of a plurality of virtual points positioned near the predetermined place to the positions of the plurality of virtual points on the plurality of images picked up by the plurality of image pickup means. The determining means extracts the image part corresponding to the person to be recognized from a plurality of images based on a plurality of images of situations picked up by the plurality of image pickup means, where the situations are indicative of the person to be recognized pointing to either a specific position or a specific direction, and the determining means determines the position of the feature point of the person to be recognized in the each image. Then, the determining means determines the three-dimensional coordinates of the feature point based on the determined position of the feature point and the information stored in the storing means, and determines either the position or the direction pointed to by the person to be recognized based on the determined three-dimensional coordinates of the feature point.

Thus, in the fifth aspect of the present invention, a correspondence between the three-dimensional coordinates of a plurality of virtual points positioned near the predetermined place, and the positions of the plurality of virtual points on the plurality of images picked up by the plurality of image pickup means is previously confirmed from the information stored in the storing means. The three-dimensional coordinates of the feature point of the person to be recognized is determined based on the information stored in the storing means. Thus, the three-dimensional coordinate of the feature point of the person to be recognized can be determined by a very simple processing. Therefore, it is possible to reduce the time required for the determination of an instruction from the person to be recognized without the use of an image processor or the like having a high processing speed and a complicated construction.

On the other hand, in the fifth aspect of the present invention, it is desirable that many virtual points are stored by corresponding the three-dimensional coordinates thereof to the positions thereof on the images in order to determine the three-dimensional coordinates of the feature point of the person to be recognized with a high level of accuracy. More preferably, the storing means stores the information for corresponding the three-dimensional coordinates of many virtual points constantly spaced in a lattice arrangement near the predetermined place, to the positions of these many virtual points on the plurality of images picked up by the plurality of image pickup means.

In such a manner, many virtual points are constantly spaced in the lattice arrangement, whereby, even if the feature point is located in any position near the predetermined place, the virtual point is positioned in proximity to the feature point. The three-dimensional coordinate of the feature point are determined based on the three-dimensional coordinates of the virtual point which is likely to exist in proximity to the feature point on the three-dimensional coordinates, whereby the three-dimensional coordinates of the feature point can be determined with a high level of accuracy regardless of the position of the feature point on the three-dimensional coordinates.

When many virtual points are constantly spaced in the lattice arrangement in the above-described manner, the three-dimensional coordinate of the feature point can be determined in the following manner, for example.

Namely, the determining means of the fifth aspect of the present invention can determine the position of the feature point of the person to be recognized in the images, extract from the images the virtual points positioned in a region within a predetermined range including the feature point on the images, and determine the three-dimensional coordinates of the feature point in accordance with the three-dimensional coordinates of the common virtual points extracted from the images.

Thus, the virtual points positioned in the region within a predetermined range including the feature point on the images are extracted from the images, whereby all the virtual points which are likely to exist in the region adjacent to the feature point on the three-dimensional coordinate are extracted. An area of this region can be defined in response to a space between the virtual points.

Then, the determining means determines the three-dimensional coordinates of the feature point based on the three-dimensional coordinates of the common virtual points extracted from the images. The images picked up by the image pickup means show the situation within the image pickup range, namely, the subject projected on a plane. Therefore, even if a plurality of points, which are positioned as if they were superimposed when seen from the image pickup means, have different three-dimensional coordinates, the points are located in the same position when picked up on a two-dimensional image. On the other hand, since the common virtual points extracted from the images are present in the position adjacent to the feature point on the three-dimensional coordinates, the three-dimensional coordinates of the feature point are determined from the three-dimensional coordinates of the common extracted virtual points, whereby the three-dimensional coordinates of the feature point can be determined with a higher level of accuracy.

When a positional relationship is exactly constant between a predetermined place at which the person to be recognized arrives and the image pickup means, the information to be stored in the storing means can be set permanently based on the result of an experimental measurement or the like of the three-dimensional coordinates of plural virtual points positioned near a predetermined place, and the positions of plural virtual points on the images picked up by the image pickup means. On the other hand, when there is a variation in the position between a predetermined place at which the person to be recognized arrives and the image pickup means, or when this positional relationship is considerably different in design depending on the individual hand pointing apparatuses, it is necessary to reset the information to be stored in the storing means.

From this point of view, the fifth aspect of the present invention further can comprise: generating means for allowing the plurality of image pickup means to pickup images of the situations where markers are positioned in the positions of the virtual points, the generating means for generating the information for corresponding the three-dimensional coordinates of the virtual points to the positions of the virtual points on the images based on the three-dimensional coordinates of the virtual points and the marker positions on the images picked up by the plurality of image pickup means, and the generating means for allowing the storing means to store the generated information.

Any marker will do as long as the marker is easy to identify on the images obtained by the image pickup. For example, a particular-color mark and a light-emission source such as LED can be used as the marker. The marker may be manually positioned in a predetermined position by a person. Alternatively, the marker may be automatically positioned by moving means for moving the marker to an optional position. When the marker is moved by the moving means, the three-dimensional coordinates of a predetermined position can be determined from the amount of movement of the marker caused by the moving means.

The generating means is provided in the above-mentioned manner, whereby the information for corresponding the three-dimensional coordinates of the virtual points to the positions of the virtual points on the images is automatically generated. Thus, even if there is variation in the position between a predetermined place at which the person to be recognized arrives and the image pickup means, or when this positional relationship is considerably different in design depending on the individual hand pointing apparatuses, it is possible to obtain automatically the information for corresponding the three-dimensional coordinates of the virtual points to the positions of the virtual points on the images with a high level of accuracy.

According to the fifth aspect of the present invention, the information for corresponding the three-dimensional coordinates of a plurality of virtual points positioned near a predetermined place at which the person to be recognized arrives, to the positions of a plurality of virtual points on a plurality of images picked up by a plurality of image pickup means is stored. The three-dimensional coordinates of the feature point is determined based on the position of the feature point on a plurality of images picked up by a plurality of image pickup means and the stored information. Thus, the effect is obtained in which it is possible to provide a hand pointing apparatus of simple construction wherein the time required for the determination of an instruction from the person to be recognized is reduced and the accuracy of instruction determination is excellent.

A hand pointing apparatus according to a sixth aspect of the present invention comprises: illuminating means for illuminating a person to be recognized; a plurality of image pickup means for picking up the image of the person to be recognized, who is illuminated by the illuminating means from different directions; determining means for extracting an image part corresponding to the person to be recognized from a plurality of images based on a plurality of images of situations picked up by the plurality of image pickup means, the situations being indicative of the person to be recognized pointing to either a specific position or a specific direction, and for determining either the position or the direction pointed to by the person to be recognized; first detecting means for extracting the image part corresponding to a predetermined part of the body of the person to be recognized from the plurality of images, and for detecting a change in any one of either an area of the extracted image part, an outline of the extracted image part and a length of an outline of the extracted image part; and processing means for executing a predetermined processing when the change is detected by the first detecting means.

The sixth aspect of the present invention is provided with the first detecting means for extracting the image part corresponding to a predetermined part (for example, the hand, the arm or the like) of the body of the person to be recognized in the plurality of images and for detecting a change in either the area of the extracted image part, the change in the contour of the extracted image part, or the change in the length of the contour line of the extracted image part. The processing means executes a predetermined processing when a change is detected by the first detecting means. The area, the contour, and the length of the contour line of the image part can be relatively easily detected. Moreover, when the person to be recognized moves a predetermined part of the body, even if his/her motion is not a predefined motion, in almost all cases, the area, the contour, and the length of the contour, and the length of the contour line of the image part corresponding to a predetermined part are changed.

Therefore, according to the sixth aspect of the present invention, since a change in the area, the contour, or the length of the contour line of the image part is used, it is possible to improve the degree of freedom of movement which the person to be recognized has in order to instruct the processing means to execute a predetermined processing. This movement can be also detected in a short time. Thus, the effect is obtained in which the instruction from the person to be recognized can be determined in a short time.

On the other hand, when a person beings makes a movement to point to a specific position or a specific direction, even if the position or direction to be pointed to is changed, the fingertip or the like is generally merely moved along a virtual spherical surface centered in the vicinity of the shoulder joint, thereby resulting in little change in the distance between the fingertip or the like and the body including the shoulder joint.

Thus, a hand pointing apparatus according to a seventh aspect of the present invention comprises: illuminating means for illuminating a person to be recognized; a plurality of image pickup means for picking up the image of person to be recognized, who is illuminated by the illuminating means from different directions; determining means for extracting an image part corresponding to the person to be recognized from a plurality of images based on a plurality of images of situations picked up by the plurality of image pickup means, the situations being indicative of the person to be recognized pointing to either a specific position or a specific direction, for determining the three-dimensional coordinates of the feature point whose position is changed when the person to be recognized bends or extends an arm and the three-dimensional coordinates of a reference point whose position is not changed even if the person to be recognized bends or extends an arm, and for determining either the position or the direction pointed to by the person to be recognized in accordance with the three-dimensional coordinates of the feature point and the three-dimensional coordinates of the reference point; and processing means for calculating the distance between the reference point and the feature point and for executing a predetermined processing based on the change in the distance between the reference point and the feature point.

The determining means according to the seventh aspect of the present invention extracts the image part corresponding to the person to be recognized from a plurality of images, determines the three-dimensional coordinates of the feature point whose position is changed when the person to be recognized bends or extends an arm and the three-dimensional coordinates of the reference point whose position is not changed even if the person to be recognized bends or extends an the arm, and determines either the position or the direction pointed to by the person to be recognized based on the three-dimensional coordinates of the feature point and the three-dimensional coordinates of the reference point. The processing means calculates the distance between the reference point and the feature point, and executes a predetermined processing based on the change in the distance between the reference point and the feature point. For example, the tip of the hand, the finger or the like of the person to be recognized or the point corresponding to the tip or the like of a pointer held by the person to be recognized can be used as the feature point. For example, a point corresponding to the body (such as the chest and the shoulder joint) of the person to be recognized can be used as the reference point.

Thus, if the person to be recognized makes a motion to adjust the direction of the feature point with respect to the reference point so that the direction from the reference point toward the feature point may match the position or direction to be pointed to, the pointed position or direction pointed to is determined by the determining means. If the person to be recognized makes a motion to bend or extend the arm, the distance between the reference point and the feature point is changed, so that a predetermined processing is thus performed based on this change in the distance.

Thus, in the seventh aspect of the present invention, since the position or direction pointed to by the person to be recognized is determined from the positional relationship between the reference point and the feature point, the direction in which the image pickup means picks up the image can be set so that the reference point and the feature point can be reliably detected without taking into account motions such as the raising and lowering of the finger. Furthermore, since whether or not the execution of a predetermined processing is instructed is determined on the basis of the change in the distance (relative position) between the reference point and the feature point, it is unnecessary to detect additional image features in order to determine whether or not the execution of a predetermined processing is being instructed. In addition, the distance between the reference point and the feature point scarcely changes even if a person makes a motion to point to a specific position or a specific direction.

Therefore, according to the seventh aspect of the present invention, it is possible to reliably detect the motion of the person to be recognized to instruct the execution of a predetermined processing (the motion to bend or extend the arm) in a short time. The instruction from the person to be recognized can thus be confirmed in a short time.

The processing means can execute, as a predetermined processing, the processing associated with the position or direction pointed to by the person to be recognized, for example, when the distance between the reference point and the feature point is changed. Since the motion to bend or extend the arm is a very natural motion, if this motion is used to instruct the above-described execution of a predetermined processing, the person to be recognized can make the motion for instructing the execution of a predetermined processing without feeling a sense of uncomfortableness.

Furthermore, the direction of the change in the distance between the reference point and the feature point due to the motion to bend or extend the arm is of two types (a direction of increase in the distance and a direction of reduction in the distance). Thus, when the distance between the reference point and the feature point is increased, a first predetermined processing may be carried out. When the distance between the reference point and the feature point is reduced, a second predetermined processing differing from the first predetermined processing may be carried out.

Thus, when the person to be recognized makes a motion to extend an arm (in this case, the distance between the reference point and the feature point is increased), the first predetermined processing is carried out. When the person to be recognized makes a motion to bend the arm (in this case, the distance between the reference point and the feature point is reduced), the second predetermined processing is carried out. It is therefore possible for the person to be recognized to select the processing to be executed from either the first predetermined processing or and second predetermined processing, similarly to such as left and right clicks of a mouse. The person to be recognized makes either the extending motion or the bending motion, whereby it is possible to reliably execute the processing selected from either the first predetermined processing or second predetermined processing by the person to be recognized.

For the determination of whether or not the execution of a predetermined processing is instructed on the basis of a change in the distance between the reference point and the feature point, more particularly, for example, the magnitudes of the change in the distance between the reference point and the feature point are compared. If the change in the distance is a predetermined value or more, it is possible to determine that the execution of a predetermined processing is instructed. However, if the distance between the reference point and the feature point is considerably changed due to other motions having no intention of the execution of a predetermined processing, then it is possible that the instruction from the person to be recognized may be mistaken.

From this point of view, preferably, the processing means detects the rate of change in the distance between the reference point and the feature point, that is, the velocity of the change, and executes a predetermined processing when the detected velocity of change is a at threshold value or more.

In the seventh aspect of the present invention, the velocity of the change in the distance between the reference point and the feature point is detected, and a predetermined processing is then executed only when the detected velocity of the change is at the threshold value or more. In such a manner, the person to be recognized makes a specific motion to quickly bend or extend on arm, whereby the velocity of the change in the distance between the reference point and the feature point reaches the threshold value or more, so that a predetermined processing is executed. Thus, the rate of recognition of the motion of the person to be recognized for instructing the execution of a predetermined processing is improved. Only when the person to be recognized makes a motion for instructing the execution of a predetermined processing, is this motion reliably detected allowing a predetermined processing to be carried out.

Moreover, as the physique and muscular strength or the like varies depending on the person to be recognized, even if the person to be recognized makes a motion to quickly bend or extend an arm in order to allow the processing means to execute a predetermined processing, the velocity of the change in the distance between the reference point and the feature point varies depending on the individual person to be recognized. Therefore, in some cases, even if the person to be recognized makes a motion to quickly bend or extend an arm in order to instruct the processing means to execute a predetermined processing, this motion cannot be detected. In contrast to this, sometimes this motion is detected by mistake, although the person to be recognized has not made this motion.

Thus, preferably, the seventh aspect of the present invention further comprises threshold value setting means for requesting the person to be recognized to bend or extend the arm and for previously setting the threshold value based on the rate of the change in the distance between the reference point and the feature point when the person to be recognized bends or extends the arm.

In this manner, the threshold value as to whether or not the processing means executes a predetermined processing is previously set based on the rate of the change in the distance between the reference point and the feature point when the person to be recognized bends or extends an arm (quickly bends or extends an arm) in order to allow the processing means to execute a predetermined processing, whereby the threshold value can be obtained in response to the physique, muscular strength, or the like of the individual persons to be recognized. Whether or not the execution of a predetermined processing is instructed is determined by the use of this threshold value, whereby it is possible to reliably detect the motion of the person to be recognized to instruct the execution of a predetermined processing and to execute a predetermined processing, regardless of any variation in physique, muscular strength, or the like, depending on the individual person to be recognized.

Furthermore, the seventh aspect of the present invention further comprises second detecting means for extracting the image part corresponding to the arm of the person to be recognized from the plurality of images and for detecting whether or not the arm of the person to be recognized is lowered, wherein the processing means continues in its current state when the second detecting means detects that the arm of the person to be recognized is lowered. Namely, an execution state is continued when the processing is carried out, while a stop state is continued when the processing is stopped. Thus, since the person to be recognized does not need to keep raising the arm in order to continuously execute a certain processing, the task of the person to be recognized can be reduced.

According to the seventh aspect of the present invention, the position or direction pointed to by the person to be recognized is determined on the basis of the three-dimensional coordinates of the feature point whose position is changed when the person to be recognized bends or extends an arm and on the basis of the three-dimensional coordinates of the reference point whose position is not changed even if the person to be recognized bends and extends an arm, and a predetermined processing is also executed based on the change in the distance between the reference point and the feature point. Thus, the following effect is obtained. Namely, it is possible to reliably detect the motion of the person to be recognized to instruct the execution of a predetermined processing in a short time, and it is also possible to determine the instruction from the person to be recognized in a short time.

BRIEF DESCRIPTION OF THE DRAWINGS

FIG. 2 is a block diagram showing a schematic constitution of a hand pointing input apparatus according to the present embodiment.

FIG. 6 is a flow chart of an illumination control processing.

FIG. 7 is a timing chart showing a timing of the switch-on/off of illuminators A, B by the illumination control processing of FIG. 6 and of an output (capture) of an image picked up by the video camera.

FIGS. 8A and 8B are a flow chart of an instruction determination processing.

FIGS. 12A–12C are image illustrations showing an example of a motion of the information inputting person.

FIG. 13 schematically shows another example of the relationship between the illumination range of the illuminator and the image pickup range of the video camera.

FIG. 21 is a flow chart of the processing for setting the click motion speed.

FIG. 22A is an image illustration for describing a forward click motion.

FIG. 22B is an image illustration for describing a backward click motion.

DETAILED DESCRIPTION OF THE PREFERRED EMBODIMENTS

Figure 1:
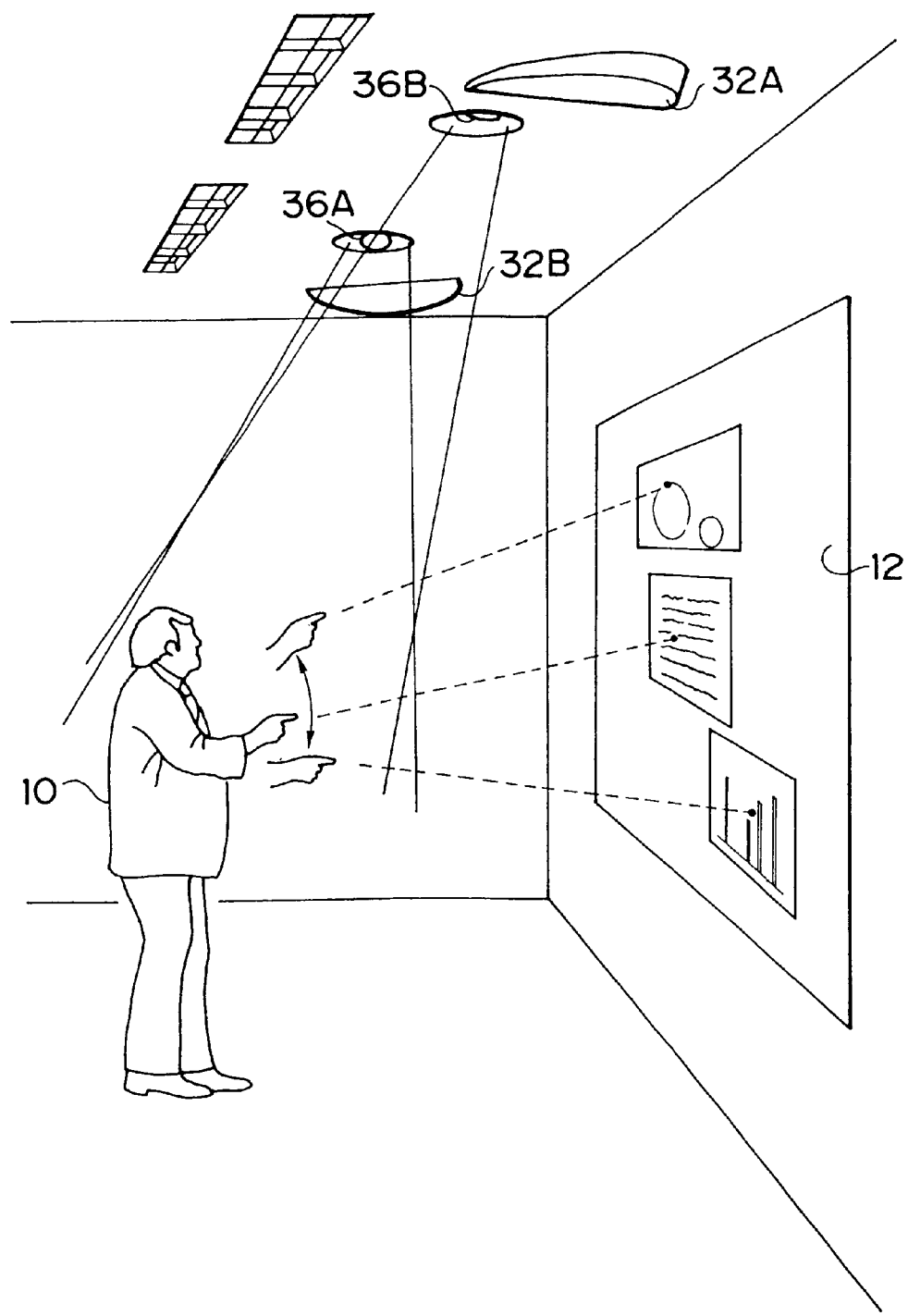
FIG. 1 is a perspective view showing surroundings of an information input space.

Embodiments of the present invention will be described below in detail with reference to the accompanying drawings. As shown in FIG. 1, a large-screen display 12 is built into a wall surface in a place at which an information inputting person 10, who is the person to be recognized of the present invention arrives. Known display means such as a liquid crystal display (LCD), a plasma display, a cathode ray tube (CRT) and an optical fiber display can be applied as the display 12.

The display 12 is connected to an information processor 14 composed of a personal computer or the like (see FIG. 2). The information processor 14 allows various types of information to be displayed on a display surface in various display forms, such as a figure, a table, a character, an image or the like. In the present embodiment, the information inputting person 10 arrives at the place (information input space) shown in FIG. 1 in front of the display 12. The information inputting person 10 points to a position on the display surface of the display 12 on which various information is displayed, while he/she makes a click motion (described below in detail), whereby he/she gives various instructions to the information processor 14 and allows various types of processing to be executed.

As shown in FIG. 2, a controller 22 of a hand pointing input apparatus 20 according to the present embodiment is connected to the information processor 14. The controller 22 includes CPU 22A, ROM 22B, RAM 22C, and an I/O interface 22D. These elements are connected to each other through a bus. The information processor 14, a non-volatile memory 24 capable of updating stored contents, a display 26 for displaying various types of information and a keyboard 28 for inputting various instructions and data by an operator are connected to the I/O interface 22D.

An illumination control device 30 is also connected to the I/O interface 22D of the controller 22. A plurality of near-infrared light illuminators 32A and 32B for emitting a light of a wavelength within a near-infrared range in a beam manner are connected to the illumination control device 30. As shown in FIG. 1, the near-infrared light illuminators 32A and 32B are arranged in different positions over the information input space. Their radiation ranges are adjusted so that the illuminators 32A and 32B may illuminate, from different directions, the information inputting person 10 who arrives at the information input space (see FIG. 3, too). The illumination control device 30 controls the switch-on/off of the illuminators 32A and 32B in response to the instruction from the controller 22.

A pickup control device 34 is connected to the I/O interface 22D of the controller 22. A plurality of video cameras 36A and 36B arranged in different positions over the information input space (see FIG. 1) are connected to this image pickup control device 34. Although an illustration of the video cameras 36A and 36B is omitted, the video cameras 36A and 36B include an area sensor composed of a near-infrared-light-sensitive CCD or the like. A filter for transmitting only the light of the wavelength within the near-infrared range is also disposed on the light-incident side on an imaging lens for forming incident light into an image on a receptor surface of the area sensor.

Figure 3:
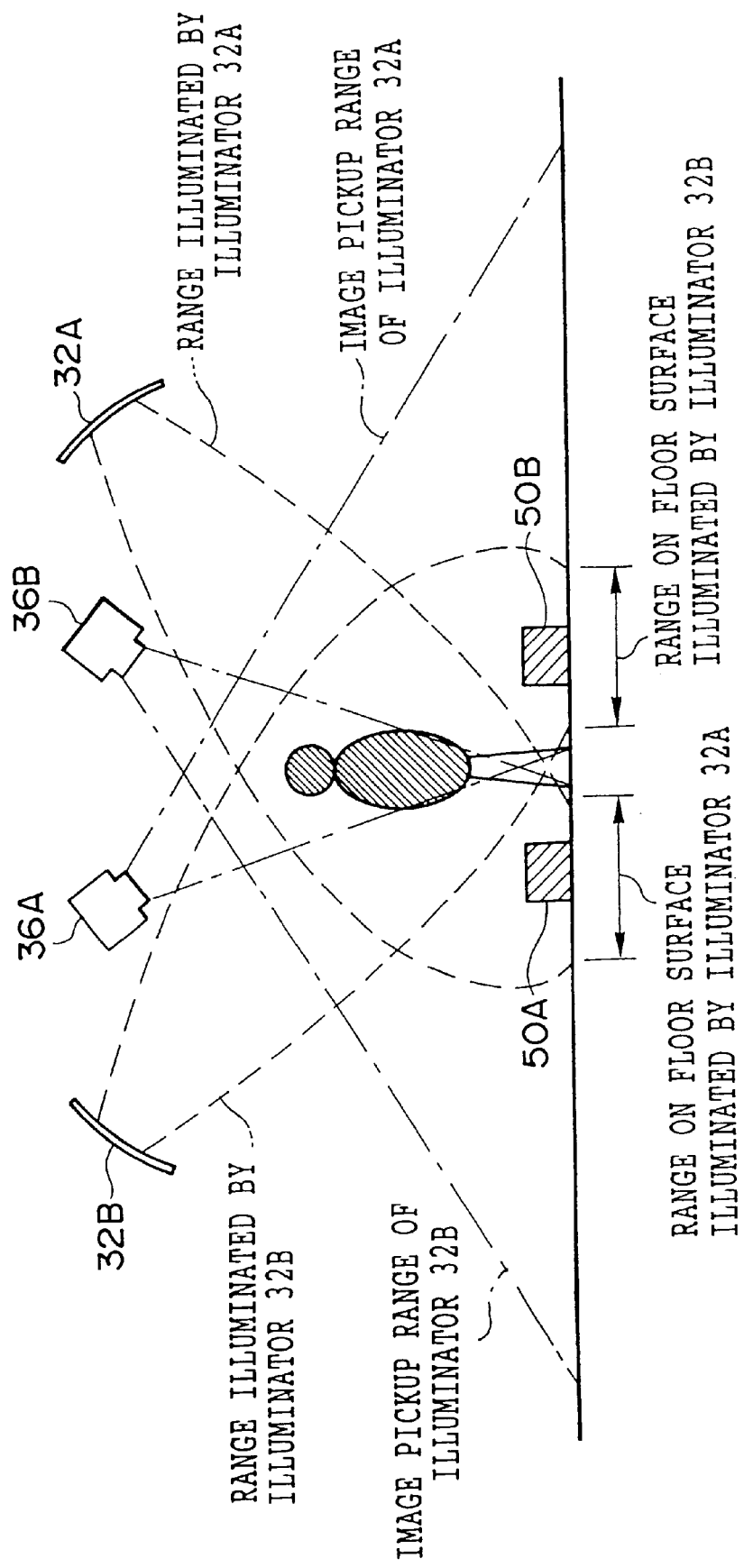
FIG. 3 schematically shows an example of a relationship between an illumination range of an illuminator and an image pickup range of a video camera.

As shown in FIG. 3, the video camera 36A is oriented so that the information inputting person 10 who arrives at the information input space may be within an image pickup range. It is also oriented so that the light emitted from the illuminator 32A corresponding to the video camera 36A dose not fall directly on the imaging lens, and so that the center of the image pickup range may cross the center of the range illuminated by the illuminator 32A at a predetermined height from the floor surface in the information input space. Therefore, the image pickup range of the video camera 36A is adjusted so that the range on the floor surface illuminated by the illuminator 32A corresponding to the video camera 36A may be out of the image pickup range. In the same manner, the video camera 36B is oriented so that the information inputting person 10 who arrives at the information input space may be within the image pickup range, the light emitted from the illuminator 32B corresponding to the video camera 36B may not fall directly on the imaging lens and the center of the image pickup range may cross the center of the range illuminated by the illuminator 32B at a predetermined height from the floor surface in the information input space. Therefore, the image pickup range of the video camera 36B is adjusted so that the range on the floor surface illuminated by the illuminator 32B corresponding to the video camera 36B may be out of the image pickup range.

In this manner, the image pickup ranges of the video cameras 36A and 36B are adjusted so that the ranges on the floor surface illuminated by the different illuminators corresponding to the video cameras may be out of the image pickup ranges.

Figure 4:
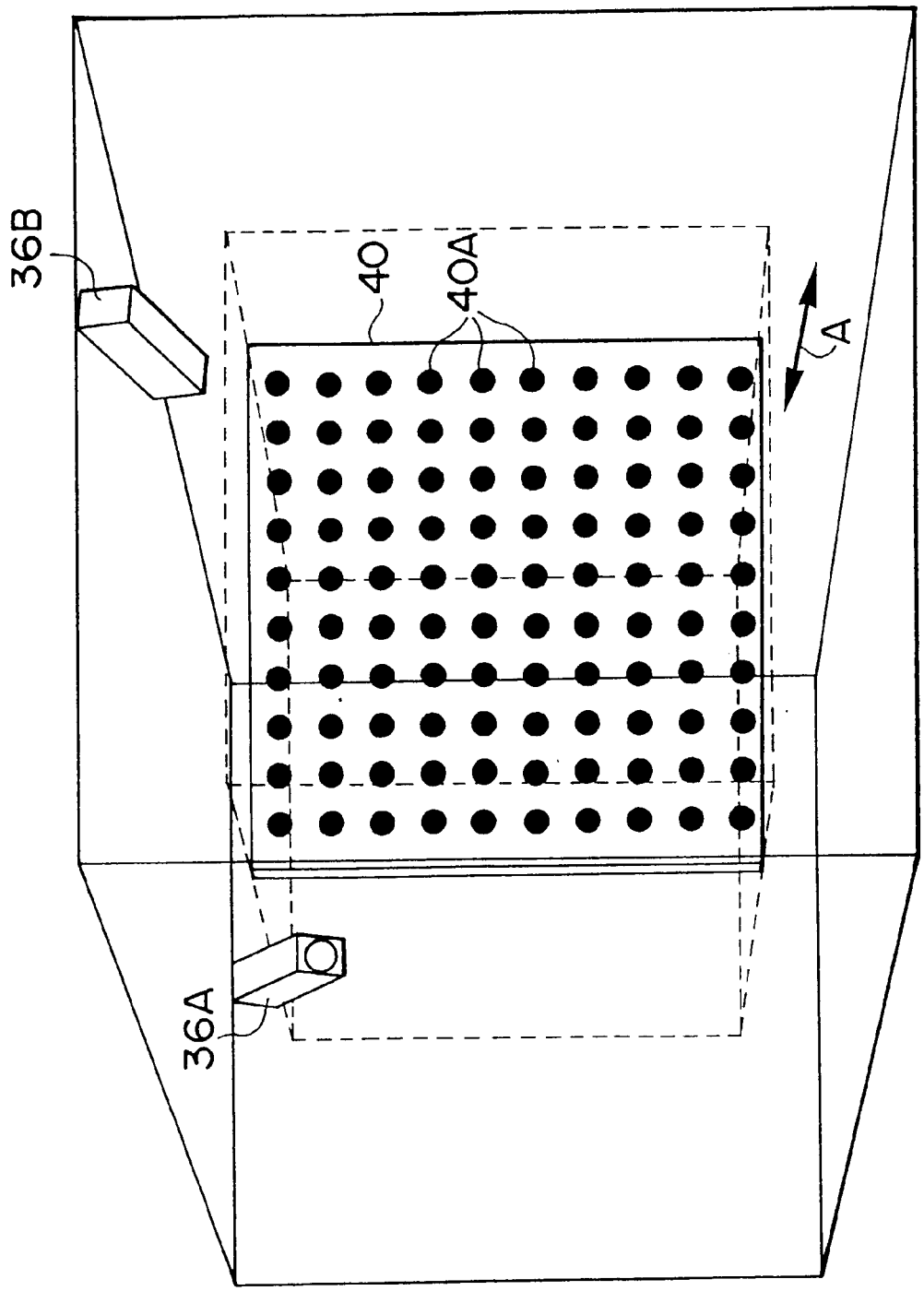
FIG. 4 is a perspective view of the information input space showing an example of a mark plate.

A mark plate driving unit 38 is also connected to the I/O interface 22D of the controller 22. As shown in FIG. 4, the hand pointing input apparatus 20 comprises a mark plate 40 arranged near the information input space. The mark plate 40 is composed of a multiplicity of marks 40A which are recorded so as to be equally spaced in a matrix form on a transparent flat plate. The mark plate 40 can be moved so that it may move a cross the information input space in a direction perpendicular to the main surface of the mark plate 40 (a direction shown by arrow A in FIG. 4). The marks 40A are colored with a color which is easy to recognize on the image (for example, red). The mark plate driving unit 38 allows the mark plate 40 to be moved in the direction of the arrow A in FIG. 4 in response to an instruction from the controller 22.

Figure 5:
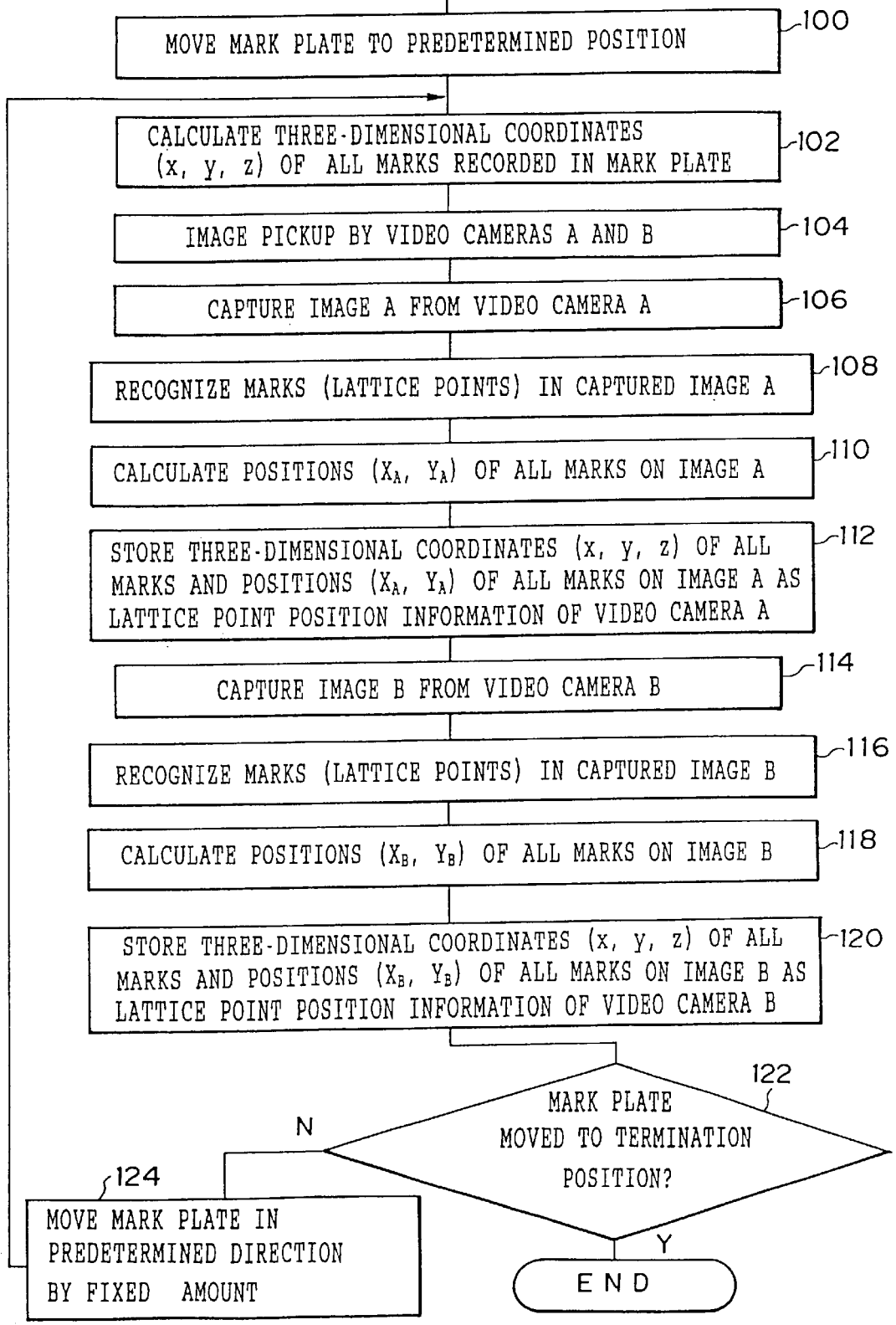
FIG. 5 is a flow chart of an initialization processing of information about a lattice point position.

A function of the present embodiment will be described below. Firstly, the initialization of lattice point position information during installation of the hand pointing input apparatus 20 will be described with reference to the flow chart of FIG. 5.

In step 100, the mark plate driving unit 38 allows the mark plate 40 to be moved to a predetermined position (a position corresponding to an end of the moving range of the mark plate 40), namely, a reference position. In the next step 102, the three-dimensional coordinates (x, y, z) of the multiplicity of marks 40A recorded on the mark plate 40 in the information input space, in the current position of the mark plate 40 are calculated. In step 104, the image of the information input space is picked up by the video cameras 36A and 36B through the image pickup control device 34. In the next step 106, the image of the information input space picked up by the video camera 36A (referred to as an image A) is captured through the image pickup control device 34.

In step 108, the marks 40A in the image A captured in step 106 are recognized (extracted). In the next step 110, the positions $(X_A, Y_A)$ of all the recognized marks 40A on the image A are calculated. In step 112, the three-dimensional coordinates (x, y, z) in the information input space of all the marks 40A in the image A are made to correspond to the positions ($X_A$, $Y_A$) of all the marks 40A on the image A, and this correspondence is stored in the memory 24 as the lattice point position information of the video camera 36A.

In subsequent steps 114 through 120, the processes of the video camera 36B are performed in the same manner as in the above-described steps 106 through 112. Namely, in the next step 114, the image of the information input space picked up by the video camera 36B (referred to as an image B) is captured through the image pickup control device 34. In step 116, the marks 40A in the image B captured in step 114 are recognized (extracted). In the next step 118, the positions ($X_B$, $Y_B$) of all the recognized marks 40A on the image B are calculated. In step 120, the three-dimensional coordinates (x, y, z) in the information input space of all the marks 40A in the image B are made to correspond to the positions ($X_B$, $Y_B$) of all the marks 40A on the image B, and this correspondence is stored in the memory 24 as the lattice point position information of the video camera 36B.

In the next step 122, whether or not the mark plate 40 is moved to a final position (a position corresponding to the end opposite to the predetermined position in step 100 within the moving range of the mark plate 40)is determined. If the determination is negative in step 122, the processing proceeds to step 124. In step 124, the mark plate driving unit 38 allows the mark plate 40 to be moved in a predetermined direction by a fixed distance (specially, the distance corresponding to the space between the marks 40A on the mark plate 40) Then, the processing is returned to step 102.

As described above, until the mark plate 40 reaches the final position, steps 102 through 124 are repeated. Thus, the multiplicity of marks 40A recorded on the mark plate 40 are moved to the positions corresponding to the multiplicity of lattice points (corresponding to virtual points) which are uniformity spaced in a lattice arrangement in the information input space. The correspondence between the three-dimensional coordinates of the lattice points in the information input space and the positions thereof on the image A is stored in the memory 24 as the lattice point position information of the video camera 36A. The correspondence between the three-dimensional coordinates of the lattice points in the information input space and the positions thereof on the image B is also stored in the memory 24 as the lattice point position information of the video camera 36B.

The lattice point position information initialized by the above-mentioned lattice point position information initialization corresponds to the information for corresponding the three-dimensional coordinates of the virtual points to the positions of the virtual points on the image. The memory 24 corresponds to the storing means of the present invention. Since the mark plate 40 and the mark plate driving unit 38 are used only for the above-mentioned lattice point position information initialization and are not used for the following processing, the mark plate 40 and the mark plate driving unit 38 may be removed after the initialization.

Referring to the flow chart of FIG. 6, the following description is provided for an illumination control processing which is regularly carried out by the controller 22 after the above-mentioned lattice point position information initialization. In step 130, the illumination control device 30 switches on the illuminator 32A and switches off the illuminator 32B. In step 132, an image of the information input space is picked up by the video camera 36A, and the image is then output from the video camera 36A. In step 134, whether or not a predetermined time period has passed since the illuminator 32A was switched on is determined. Processing dose not begin until a positive determination is made.

If an affirmative determination is made in step 134, the processing proceeds to step 136. In step 136, the illumination control device 30 switches off the illuminator 32A and switches on the illuminator 32B. In step 138, an image of the information input space is picked up by the video camera 36B, and the image is then output from the video camera 36B. In step 140, whether or not a predetermined time period has passed since the illuminator 32A was switched on is determined. Processing dose not begin until a positive determination is made. Then, if an affirmative determination is made in step 140, the processing returns to step 130.

As shown in FIG. 7, too, the above-described illumination control processing allows the illuminators 32A and 32B to be alternately switched on/off at a predetermined time interval. When the illuminator 32A is switched on, the image is picked up by the video camera 36A, and image data indicating the image A picked up by the video camera 36A is then output to the controller 22 through the image pickup control device 34. When the illuminator 32B is switched on, the image is picked up by the video camera 36B, and the image data indicating the image B picked up by the video camera 36B is then output to the controller 22 through the image pickup control device 34.

In the present embodiment, since the image pickup is performed by means of a near-infrared light, the luminance of the image part corresponding to the information inputting person 10 in the picked up image is not influenced, and thus not altered by a change in the luminance of the display 12 when a visible light is emitted therefrom, or by the skin color or clothing color of the information inputting person 10. Therefore, in the instruction determination processing as described below, the image part corresponding to the information inputting person 10 can be extracted with a high level of accuracy. Moreover, even if a fluorescent tube, which is processed so that light of the wavelength of the near-infrared range is not be emitted therefrom, is disposed near the information input space, the processing is not influenced by this fact. Furthermore, since the emission of the near-infrared light is not perceived by the information inputting person 10, the above-described alternate switch-on/off of the illuminators 32A and 32B does not give an uncomfortable feeling to the information inputting person 10.

Figure 8A:
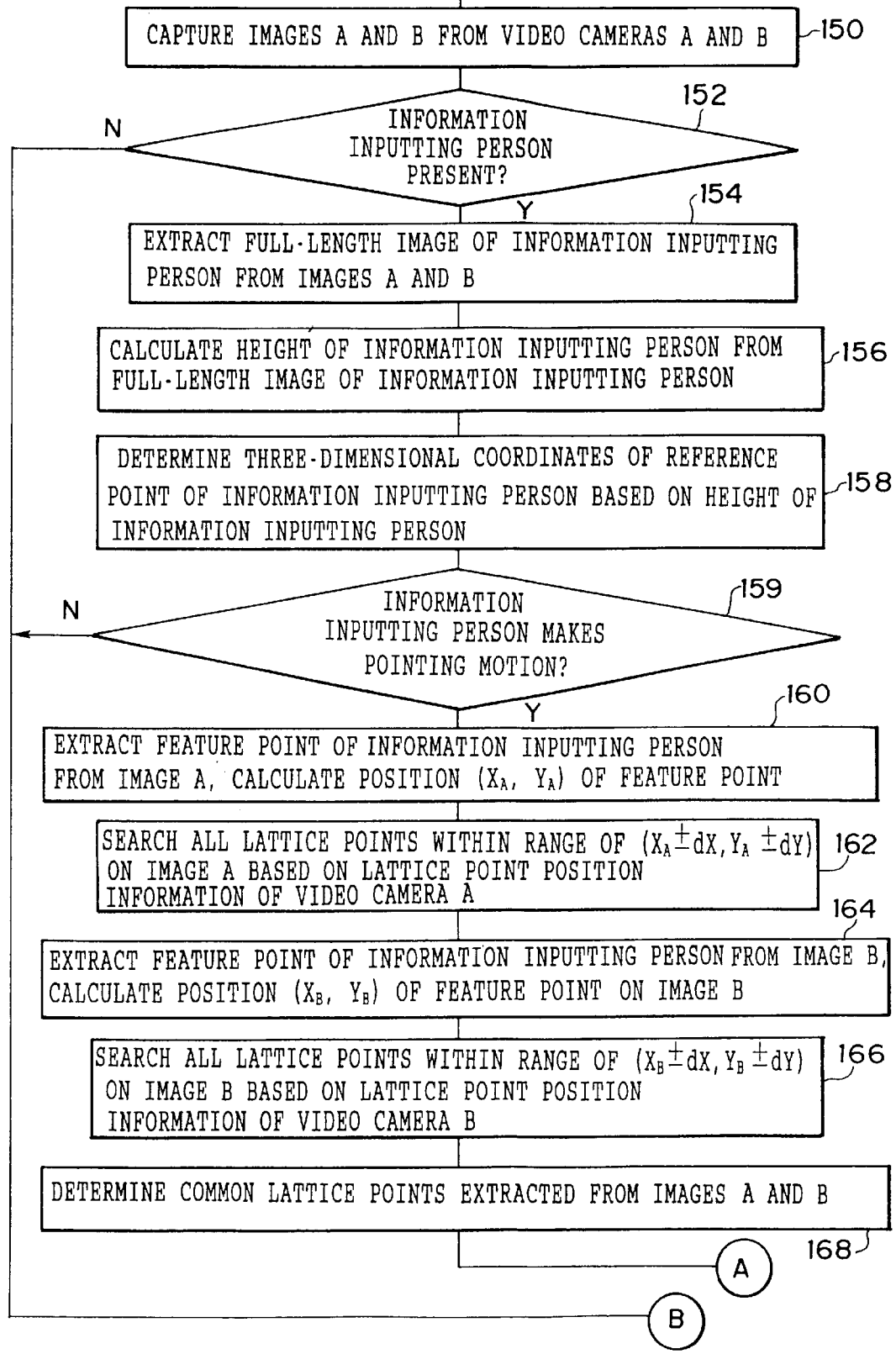

Referring to the flow chart of FIGS. 8A and 8B, the following description is provided for the instruction determination processing for determining the instruction from the information inputting person 10, which is repeated at a predetermined time interval by the controller 22, together with the aforementioned illumination control processing.

In step 150, the image data indicating the image A output from the video camera 36A and the image data indicating the image B output from the video camera 36B are captured at the timing shown in FIG. 7. In the next step 152, whether or not the information inputting person 10 is present in the information input space is determined based on the image data of the images A and B captured in step 150.

As described above, the image of the information input space is picked up by the video camera 36A when the illuminator 32A alone is switched on, and the image pickup range of the video camera 36A is adjusted so as to be out of the range on the floor surface illuminated by the illuminator 32A. Accordingly, even if an object 50A which is not a subject to be recognized (see FIG. 3) such as the luggage of the information inputting person 10 or trash is present within the range on the floor surface illuminated by the illuminator 32A, this object 50A which is not the subject to be recognized is not within the image pickup range of the video camera 36A. Furthermore, if an object 50B which is not the subject to be recognized (see FIG. 3) is present within the range on the floor surface picked up by the video camera 36A, an image of the object 50B which is not the subject to be recognized is picked up by the video camera 36A. However, since the object 50B which is not the subject to be recognized is out of the range illuminated by the illuminator 32A, the luminance of the image part corresponding to the object 50B which is not the subject to be recognized in the image A is very low.

Furthermore, the image of the information input space is picked up by the video camera 36B when the illuminator 32B alone is switched on, and the image pickup range of the video camera 36B is adjusted so that it may be out of the range on the floor surface illuminated by the illuminator 32B. Accordingly, even if the object 50B which is not the subject to be recognized is present on the floor surface illuminated by the illuminator 32B, this object 50B which is not the subject to be recognized is not within the image pickup range of the video camera 36B. Furthermore, if the object 50A which is not the subject to be recognized is present within the range on the floor surface picked up by the video camera 36B, the image of the object 50A which is not the subject to be recognized is picked up by the video camera 36B and thus the image part corresponding to the object 50A which is not the subject to be recognized is present in the image B. However, in the same manner as described above, the luminance of the image part corresponding to the object 50A is very low.

Therefore, in the previous step 152, whether or not the information inputting person 10 is present in the information input space can be determined by a very simple determination of, for example, whether or not the image part having a high luminance, and an area of a predetermined value or more, is present in the images A and B. When a negative determination is made in step 152, no processing is carried out and the instruction determination processing is completed.

On the other hand, if an affirmative determination is made in step 152, the processing proceeds to step 154. The processing from step 154 corresponds to the determining means of the present invention. In step 154, the image part corresponding to a full-length image of the information inputting person 10 are extracted from the images A and B. The image part corresponding to the full-length image of the information inputting person 10 can be also easily extracted by determining a continuous region which is composed of high-luminance pixels and has the area of a predetermined value or more.

Figure 9:
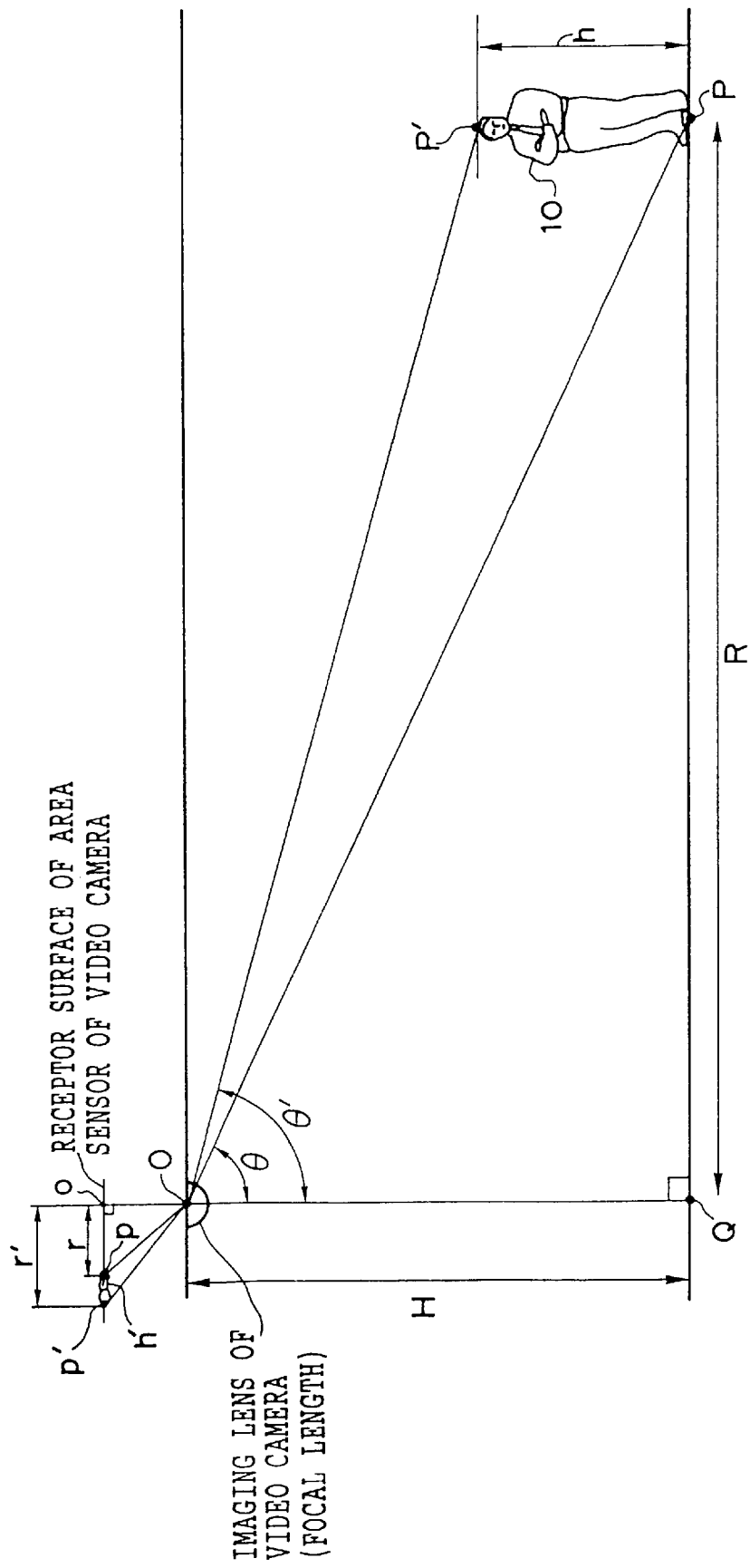
FIG. 9 is a side view of the information input space for describing a calculation of the height of an information inputting person and the position of the information inputting person on a floor surface.

In step 156, the height of the information inputting person 10 is calculated based on the image part corresponding to the full-length image of the information inputting person 10. As shown in FIG. 9, f denotes a focal length of the imaging lens of the video camera positioned at a point O, H denotes the distance between an intersection point Q of a vertical line passing through the point O and the floor surface in the information input space and the point O, R denotes the distance between the point Q and a point P on the floor surface on which the information inputting person 10 is standing, and a distance h between a point P' corresponding to the top of the head of the information inputting person 10 and the point P is defined as the height of the information inputting person 10. Assuming that θ denotes ∠POQ; θ' denotes ∠P'OQ; h' denotes the length of the image of the information inputting person formed on the receptor surface of the area sensor of the video camera, a point p denotes an imaging point on the receptor surface corresponding to the point P; a point p' denotes the imaging point on the receptor surface corresponding to the point P'; r denotes the distance between a center O of the receptor surface and the point p; and r' denotes the distance between the center O of the receptor surface and the point p', the angles θ, θ' and the distances r, r' can be determined by the following equations (1) through (4).

$$\theta = \tan^{-1}(R/H) \tag{1}$$

$$\theta' = \tan^{-1}\{R/(H-h)\} \tag{2}$$

$$r = f\theta \tag{3}$$

$$4' = f\theta' \tag{4}$$

Therefore, the height h of the information inputting person 10 and the distance R can be determined by the following equations (5) and (6).

$$h = H\{1 - \tan(r/f)/\tan(r'/f)\} \tag{5}$$

$$R = H \tan(r/f) \tag{6}$$

Since the distance H and the focal length f are already known, in step 156, the distances r and r' are determined from either the image A or the image B picked up by the video cameras 36A or 36B, and these determined distances r and r' are then substituted in the equation (5), whereby the height h of the information inputting person 10 can be found. In step 156, the distances r are found from the images A and B, and the determined distances r are then substituted in the equation (6) so that the distances R are found, whereby the position (two-dimensional coordinates) of the information inputting person 10 on the floor surface is determined.

Figure 11A:
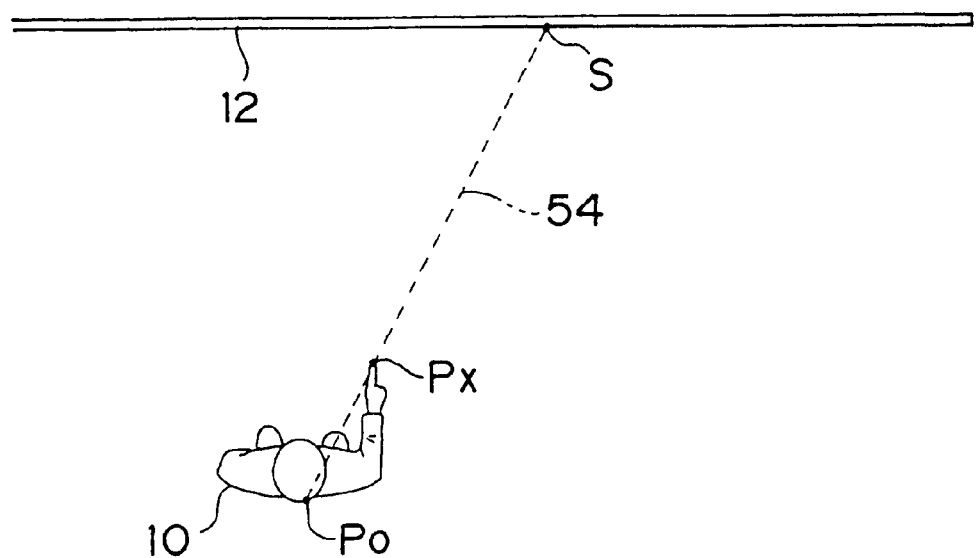
FIG. 11A is a plan view of the information input space for describing the determination of the position on a display pointed to by the information inputting person.
Figure 11B:
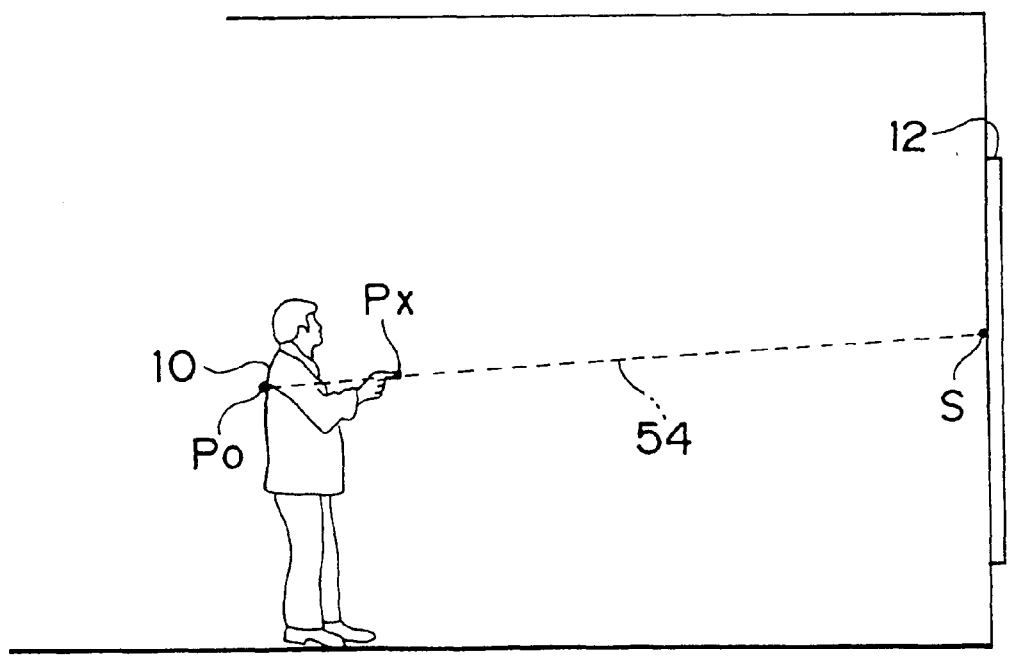
FIG. 11B is a side view of the information input space shown in FIG. 11A.

In next step 158, the three-dimensional coordinates ($x_0$, $y_0$, $z_0$) of a reference point $P_0$ of the information inputting person 10 is determined based on the height h of the information inputting person 10 and the position of the information inputting person 10 on the floor surface determined in step 156. For example, the point (the point $P_0$ shown in FIG. 11) corresponding to the back of the information inputting person 10 or the like can be used as the reference point $P_0$. In this case, the height (for example, the value $z_0$) of the reference point $P_0$, corresponding to the back of the information inputting person 10, from the floor surface is calculated in accordance with the height h of the information inputting person 10. Then, the position (plane coordinates) of the information inputting person 10 on the floor surface is set to the plane coordinate (for example, the values $x_0$ and $y_0$) of the reference point $P_0$, whereby the three-dimensional coordinates of the reference point $P_0$ can be determined.

In step 159, whether or not the information inputting person 10 makes the pointing motion (the motion to point toward the display 12 using a by the finger or the like) is determined based on the shapes of the image parts corresponding to the full-length images of the information inputting person 10 in the images A and B. Since the direction of the display 12 seen from the information inputting person 10 is already known, the determination in step 159 can be accomplished by, for example, determining whether or not the portion projecting toward the display 12, as seen from the information inputting person 10, is present at the height determinable as the position of the hand of the information inputting person 10, in the image part corresponding to the full-length image of the information inputting person 10.

Thus, when the information inputting person 10 changes his/her attitude from an upright standing attitude, as shown in FIG. 12A, into an attitude of pointing with the hand to the display 12, as shown in FIG. 12B or 12C, the determination that the information inputting person 10 is making a pointing motion is determined. If a negative determination is made in step 159, no processing is performed and the instruction determination processing is completed. On the other hand, if an affirmative determination is made in step 159, the processing proceeds to step 160.

In step 160, a feature point $P_X$ of the information inputting person 10 in the image A is extracted on the basis of the image data indicating the image A captured from the video camera 36A, and the position $(X_A, Y_A)$ of the feature point $P_X$ on the image A is calculated. The point corresponding to the fingertip pointing to the display 12 or the like can be used as the feature point $P_X$ of the information inputting person 10. In this case, this calculation can be accomplished by defining, as the position of the feature point $P_X$, the position whose the tip of the portion projecting toward the display 12 is positioned at a height determinable as the position of the hand of the information inputting person 10, in the image part indicating the full-length image of the information inputting person 10.

Figure 10A:
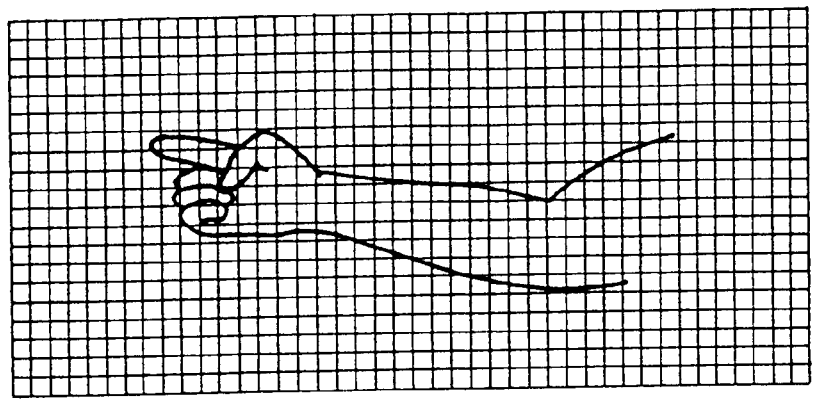
FIG. 10A is an image illustration showing an image of hand of the information inputting person picked up by the video camera.
Figure 10B:
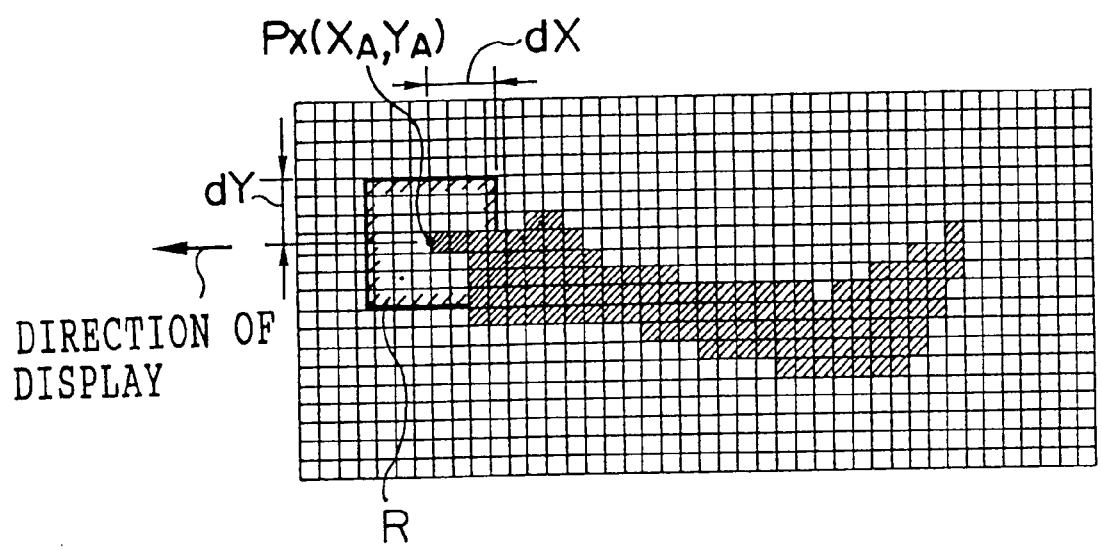
FIG. 10B is a conceptual view of a search range for the lattice point for determining a coordinate of a feature point and three-dimensional coordinate of the feature point.

Thus, when the image of the hand of the information inputting person 10 is picked up by the video camera 36A, as shown in FIG. 10A, the coordinates $(X_A, Y_A)$ of the feature point $P_X$, as shown in FIG. 10B, is calculated in order to determine the position of the feature point $P_X$.

In step 162, all the lattice points whose positions on the image A are within the range (a range R shown in FIG. 10B) of $(X_A \pm dX, Y_A \pm dY)$ are searched based on the lattice point position information of the video camera 36A stored in the memory 24. The sizes of dX and dY are defined on the basis of the space between the lattice points (the space between the marks 40A) so that at least one lattice point or more may be extracted.

In the present embodiment, a wide-angle lens is used as the imaging lens of the video camera. Thus, assuming that dX and dY are constant, the longer the distance between the video camera and the lattice points gets, the more lattice points are within the range of $(X_A \pm dX, Y_A \pm dY)$, thereby resulting in a deterioration of the accuracy of calculating the three-dimensional coordinates of the feature point $P_X$ as described below. Thus, dX and dY are set so that the values thereof are reduced as the distance from the video camera to dX and dY gets longer on the three-dimensional coordinates. Therefore, the range corresponding to $(X_A \pm dX, Y_A \pm dY)$ on the three-dimensional coordinate is shaped into a quadrangular pyramid whose bottom surface is positioned on the side of the video camera. In this step 162, the virtual points positioned within a predetermined range including the feature point on the image are extracted.

In step 164, in the same manner as the previous step 160, the feature point $P_X$ of the information inputting person 10 in the image B is extracted on the basis of the image data indicating the image B, captured from the video camera 36B, and the position $(X_B, Y_B)$ of the feature point $P_X$ on the image B is calculated. In step 166, in the same manner as the previous step 162, all the lattice points whose positions on the image B are within the range of $(X_B \pm dX, Y_B \pm dY)$ are searched on the basis of the lattice point position information of the video camera 36B stored in the memory 24. In this step 166, the virtual points positioned within a predetermined range including the feature point on the image are also extracted.

In next step 168, the common extracted lattice points are determined on the basis of the lattice points extracted from the images A and B as described above. By this determination, only a plurality of lattice points in the position adjacent to the feature point $P_X$ in the information input space are extracted. In step 170, the three-dimensional coordinates of the common lattice points extracted from the images A and B are captured from the lattice point position information.

In this embodiment, as described below, the three-dimensional coordinates of the feature point $P_X$ are calculated by an interpolation from the three-dimensional coordinates of plural lattice points in the position adjacent to the feature point in the information input space, (more specifically, a coordinate value of the three-dimensional coordinates of the feature point is found by a weighted average of the coordinate values of the three-dimensional coordinates of plural lattice points). Thus, previous to the calculation of the three-dimensional coordinates of the feature point $P_X$, in the next step 172, a rate of interpolation from the three-dimensional coordinates of the common lattice points extracted from the images A and B (a weight to the coordinate values of the three-dimensional coordinates of the lattice points) is determined based on the positions on the images A, and B of the common lattice points extracted from the images A and B, the position $(X_A, Y_A)$ of the feature point $P_X$ on the image A, and the position $(X_B, Y_B)$ of the feature point $P_X$ on the image B. For example, this rate of interpolation can be determined so that the weight of the coordinate values of the three-dimensional coordinates of the lattice points in the positions adjacent to the feature points on the images A and B may be increased.

In step 174, the three-dimensional coordinates $(X_X, Y_X, Z_X)$ of the feature point $P_X$ are calculated on the basis of the three-dimensional coordinates of the common lattice points extracted from the images A and B and the rate of interpolation determined in step 172.

In step 176, based on the three-dimensional coordinates of the reference point $P_O$ of the information inputting person calculated in the previous step 158, and the three-dimensional coordinates of the feature point $P_X$ calculated in step 174, the direction of an extended virtual line (see virtual line 54 in FIG. 11) connecting the reference point and the feature point is determined as the direction pointed to by the information inputting person 10, and the coordinates (plane coordinate) of the intersection point (see point S in FIG. 11) of the plane, including the display surface of the large-screen display 12, and the virtual line are calculated in order to determine the position pointed to by the information inputting person 10.

In the next step 178, whether or not the information inputting person 10 is pointing to the display surface of the large-screen display 12 is determined based on the coordinates determined in step 176. If a negative determination is made, a monitor flag (the flag for monitoring the click motion) is set at 0 in step 180 so as to thereby complete the instruction determination processing. On the other hand, if an affirmative determination is made in step 178, the coordinates indicating the position pointed to by the information inputting person 10 calculated in step 176 are output to the information processor 14. Thus, the information processor 14 performs the processing, for example, it allows a cursor to be displayed at a predetermined position, which is judged the position pointed to by the information inputting person 10, on the display surface of the display 12.

From the next step 184 and the steps following step 184, whether or not the information inputting person 10 makes the click motion is determined. In the present embodiment, the click motion is defined as any motion of the hand of the information inputting person (for example, bending and turning a wrist, bending and extending a finger or the like). In step 184, the image part corresponding to the hand of the information inputting person 10 in the image A is extracted so that the area of the corresponding image part is calculated, and the image part corresponding to the hand of the information inputting person 10 in the image B is also extracted so that the area of the corresponding image part is calculated.

In next step 186, whether or not the monitor flag is 1 is determined. Since a negative determination in step 186 indicates that the information inputting person 10 has not pointed to the display surface of the display 12 during the previous instruction determination processing, the monitor flag is set at 1 in step 188. In the next step 190, the area of the image part corresponding to the hand of the information inputting person 10 calculated in step 184 is stored in the RAM 22C in order to later determine the click motion, and the instruction determination processing is completed.

On the other hand, since an affirmative determination in step 186 indicates that the information inputting person 10 is continuing to point at the display surface of the display 12, the processing proceeds to step 192. In step 192, the area calculated in step 184 is compared to the area stored in the RAM 22C or the like (the area which is calculated when the information inputting person 10 starts pointing at the display surface of the display 12, namely, the time when the monitor flag was set at 1 in step 188), whereby, whether or not the area of the image part corresponding to the hand of the information inputting person 10 is changed beyond a predetermined value, is determined. A negative determination in step 192 indicates that the information inputting person 10 has not made the click motion, so that the instruction determination processing is completed without any processing.

When the information inputting person 10 bends or turns the wrist (for example, changes from the attitude shown in FIG. 12B into the attitude shown FIG. 12C or vice versa) or he/she bends or extends a finger, the areas of the image parts corresponding to the hand of the information inputting person 10 in the images A and B are changed beyond a predetermined value, whereby an affirmative determination is made in step 192. When an affirmative determination is made in step 192, the information indicating "click detected" is output to the information processor 14 in step 194. In the next step 196, the monitor flag is set at 0 and the instruction determination processing is then completed.

Thus, the information processor 14 determines that a predetermined position on the display surface of the display 12, pointed to by the information inputting person 10, (the position corresponding to the coordinates input in step 182) is clicked. Then, the information processor 14 performs the processing in response to the information displayed at a predetermined position on the display surface of the display 12.

The controller 22 of the hand pointing input apparatus 20 repeats the above-described instruction determination processing at a predetermined time interval, whereby it is possible to determine, in real time, the position on the display surface of the display 12 pointed to by the information inputting person 10 and whether or not the click motion is detected. Thus, various uses are possible as described below by combining the instruction determination processing with the processing executed by the information processor 14.

For example, the display 12 is installed on the wall surface in an underground shopping mall or the like, and a product advertisement or the like is displayed on the display 12 by the information processor 14. In this case, the hand pointing input apparatus 20 according to the present embodiment permits an interactive communication with a user, for example, a picture may be displayed describing a particular product in detail, in response to the instruction of the user (the information inputting person). Furthermore, if the user possesses a pre-paid card, the user can buy the product by paying with this card.

Moreover, for example, the display 12 is installed in an entrance of a building, and an information map giving a guide to the building or the like is displayed on the display 12 by the information processor 14. In this case, the hand pointing input apparatus 20 according to the present embodiment permits interactive communication with the user, for example, a picture may be displayed describing in detail the place in the building which the user intends to visit, or a route to the place the user intends to visit may be shown in response to the instruction of the user (the information inputting person).

In general, operating manuals and other manuals are not carried into a clean room. However, for example, the display 12 may be arranged outside the clean room so as to be visible from inside the clean room, and the contents of the operating and other manuals are displayed on the display 12 in response to the instruction from the operator in the clean room determined by the hand pointing input apparatus 20, whereby interactive communication between the inside and the outside of the clean room is possible, so that operating efficiency in the clean room is improved.

The following applications are also possible. For example, the large-screen display 12, the hand pointing input apparatus 20, and the information processor 14 may be operated as a game machine in an amusement park. In a presentation at a conference, an explanation may be displayed on the display 12, and an optional position on the display surface of the display 12 is pointed at.

In the above description, the image pickup range of the video camera 36A is adjusted so that the range on the floor surface illuminated by the illuminator 32A may be out of the image pickup range of the video camera 36A, while the image pickup range of the video camera 36B is adjusted so that the range on the floor surface illuminated by the illuminator 32B may be out of the image pickup range of the video camera 36B. The image pickup is performed by the video camera 36A when the illuminator 32A alone is switched on, while the image pickup is performed by the video camera 36B when the illuminator 32B alone is switched on. Although the images A and B, from which the image parts corresponding to the information inputting person 10 are easily extracted, are thus picked up, the present invention is not limited to this example. Even if the range on the floor surface illuminated by the illuminator 32 is within the image pickup range of the video camera, it is possible to pickup images from which the image parts corresponding to the information inputting person 10 are easily extracted.

In the example shown in FIG. 13, the image pickup range of a video camera 36 includes the range on the floor surface illuminated by the illuminator 32A, and the range on the floor surface illuminated by the illuminator 32B. The object 50A, which is not the subject to be recognized on the floor surface illuminated by the illuminator 32A, and the object 50B, which is not the subject to be recognized on the floor surface illuminated by the illuminator 32B, are picked up by the video camera 36. In such cases, the illumination control processing shown in FIG. 14 may be performed.

Figure 14:
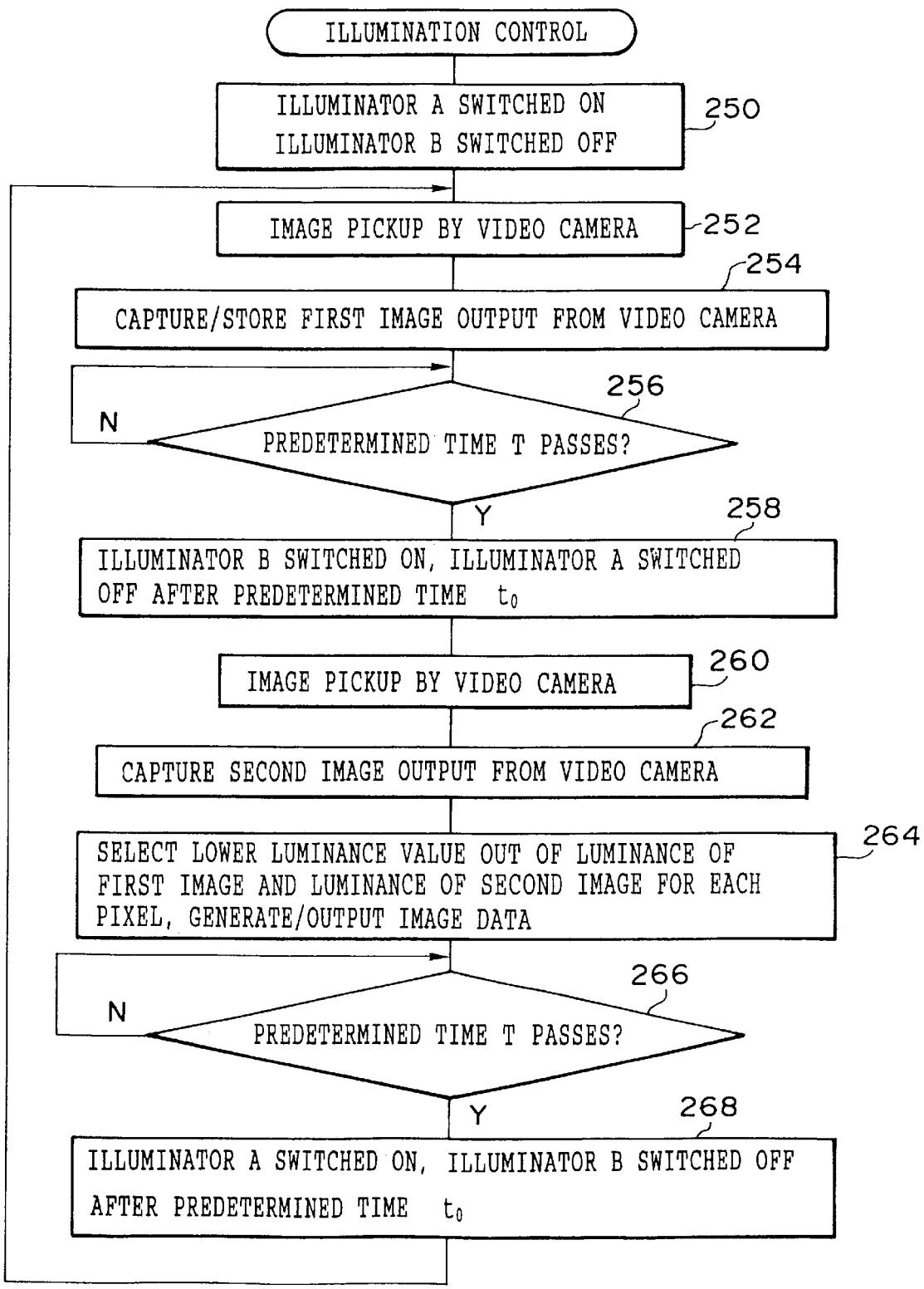
FIG. 14 is a flow chart of the illumination control processing in an arrangement shown in FIG. 13.

In the illumination control processing shown in FIG. 14, in step 250, the illuminator 32A is switched on and the illuminator 32B is switched off. Then, in step 252, an image of information input space is picked up by the video camera 36. In step 254, the image data output from the video camera 36 (the image indicated by the image data is referred to as a first image) is captured and stored in the RAM 22C. In step 256, whether or not a predetermined time T passes after the illuminator 32A is switched on is determined. Until a predetermined time T passes, the processing is not performed. If an affirmative determination is made in step 256, the processing proceeds to step 258. In step 258, the illuminator 32B is switched on, and the illuminator 32A is switched off after a predetermined time to passes after the illuminator 32B is switched on (where it should be noted that $t_0 < T$: see FIG. 15).

In the next step 260, an image of the information input space is picked up by the video camera 36. In step 262, the image data output from the video camera 36 (the image indicated by the image data is referred to as a second image) is captured. In step 264, the lower luminance value of the luminance values of a certain pixel in the first and second images is selected based on the image data indicating the first image stored in the RAM 22C in step 254, and the image data indicating the second image captured in step 262. The selected luminance value is used as the luminance value of the pixel. This processing is performed for all the pixels, whereby new image data is generated and the generated image data is output.

Figure 15:
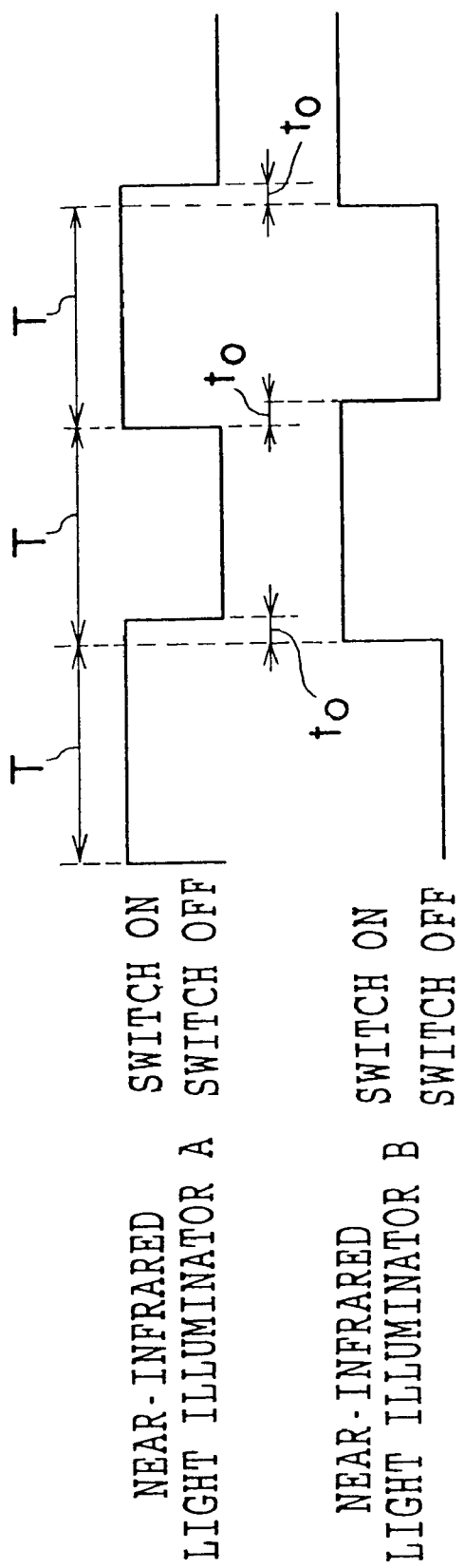
FIG. 15 is a timing chart showing the timing of the switch-on/off of the illuminators A, B by the illumination control processing of FIG. 14.

In this illumination control processing, as shown in FIG. 15, since the time period when the illuminator 32A is switched on overlaps with the time period when the illuminator 32B is switched on during a predetermined time $t_o$, the information inputting person 10 is illuminated at all times. On the other hand, as shown in FIG. 13, the object 50A which is not the subject to be recognized is illuminated only when the illuminator 32A is switched on, and the object 50B which is not the subject to be recognized is illuminated only when the illuminator 32B is switched on. Therefore, by the processing in step 262, it is possible to obtain the image in which only the image part corresponding to the information inputting person 10 has high luminance, namely, the image from which the image part corresponding to the information inputting person 10 is easily extracted (or the image data indicating this data).

In the next step 266, whether or not a predetermined time T passes after the illuminator 32B is switched on is determined. Until a predetermined time T passes, the processing is not performed. If an affirmative determination is made in step 266, the processing proceeds to step 268. In step 268, the illuminator 32A is switched on, and the illuminator 32B is switched off after a predetermined time to passes after the illuminator 32A is switched on. Then, the processing is returned to step 252.

For a simple description, a single video camera 36 alone is shown in FIG. 13, and the processing alone for a single video camera 36 is shown in FIG. 14. However, even if a plurality of video cameras 36 for picking up the information input space from different directions are provided, the above-described processing is performed for each video camera 36, whereby it is possible to obtain the images from which the image parts corresponding to the information inputting person 10 are easily extracted.

In the illumination control processing shown in FIG. 14, the image data is captured in synchronization with the switch-on/off timing of the illuminators 32A and 32B, only during the time period when either the illuminator 32A or 32B is switched on. However, for example, regardless of the switch-on/off timing of the illuminators 32A and 32B, the image data is captured at a period of 1/integral part of the predetermined time T (see FIGS. 14 and 15), whereby the processing in step 264 may be performed at a period of $2 \times T$.

Instead of selecting the lower luminance value of each pixel in the previous step 264, for example, the overlap period time to intervenes between cycles, while the illuminators 32A and 32B are alternately switched on in fixed cycles (whereby the ratio of the amount of time of switch-on for each illuminator 32A and 32B, is 50+a % where a corresponds to the overlap period time). For each pixel, average luminance in one switch-on cycle of the illuminators 32A and 32B may be used as the luminance of each pixel. Alternatively, for the change in the luminance of each pixel in one switch-on cycle of the illuminators 32A and 32B, the direct-current component alone of the change in the luminance is extracted by a low-pass filter, a fast Fourier transform, or the like, whereby the luminance value corresponding to the extracted direct-current component of the luminance change may be used as the luminance value of each pixel. Even in the above-mentioned case, the relatively high luminance value is used as the luminance value of the pixel corresponding to the information inputting person 10 which is always illuminated by the illuminator 32A or 32B during one switch-on cycle of the illuminators 32A and 32B. It is thus possible to obtain an image from which the image part corresponding to the information inputting person 10 is easily extracted.

Figure 16:
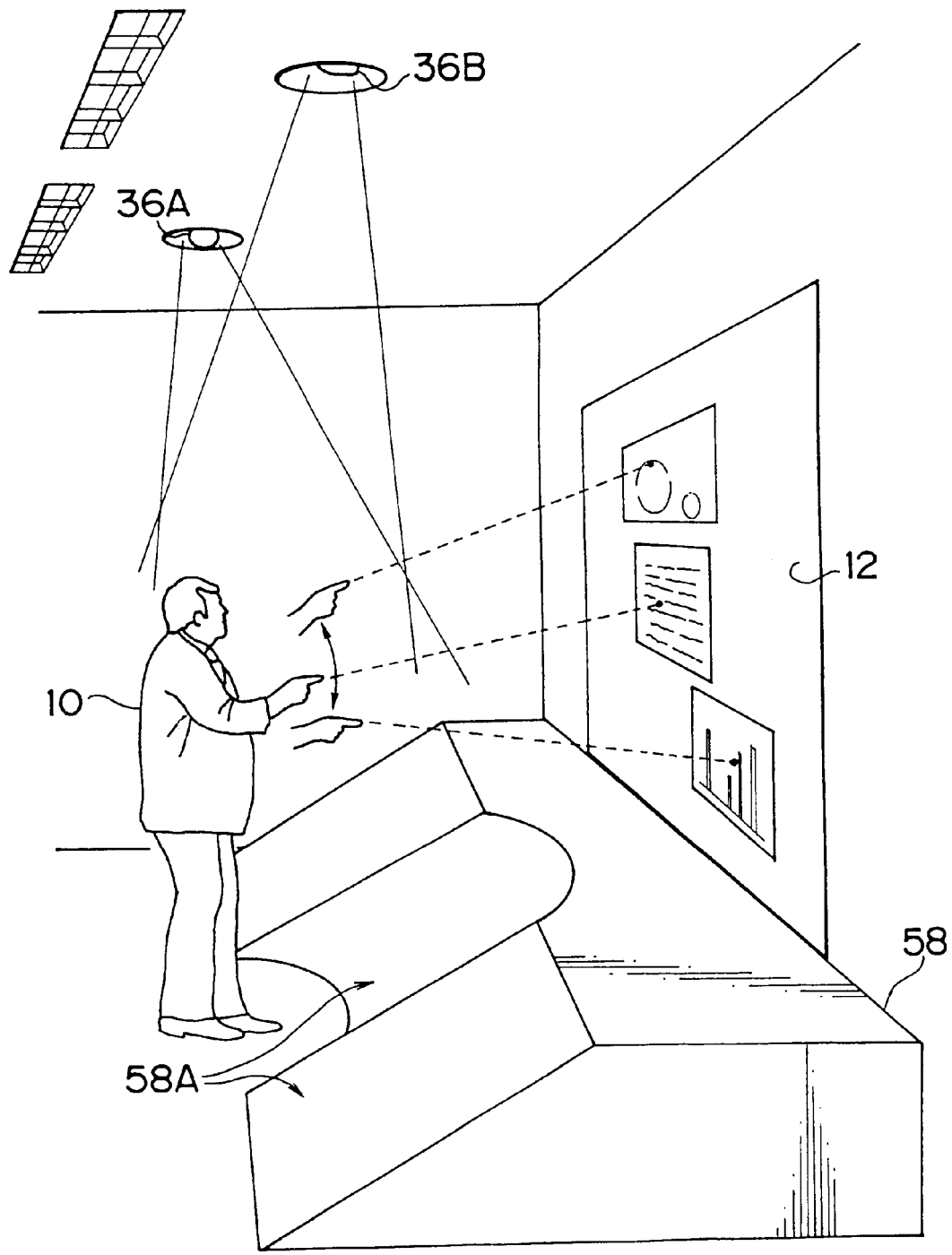
FIG. 16 is a perspective view of an aspect of a slope platform arranged on the floor surface in the information input space.

In order to obtain an image from which the image part corresponding to the information inputting person 10 is easily extracted, as shown in FIG. 16, a slope platform 58 may be arranged on the floor surface in the information input space. The slope platform 58 includes an inclined surface 58A which is formed so that it may surround the information inputting person 10 who enters the information input space. Thus, for example, even if the information inputting person 10 comes to the information input space with luggage or the like, the slope platform 58 prevents the information inputting person 10 from putting the luggage or the like near himself/herself, so that the luggage or the like is put apart from the information inputting person 10, namely, out of the image pickup range of the video camera 36. Therefore, the presence of an image part corresponding to an object which is not the subject to be recognized such as the luggage of the information inputting person 10 in the image picked up by the video camera 36 is presented. It is thus possible to obtain the image from which the image part corresponding to the information inputting person 10 is easily extracted.

When an object which is not the subject to be recognized, such as relatively small trash or dust remains around the information inputting person 10, a fan or the like for generating an air flow may be provided around the information inputting person 10 so that the object which is not the subject to be recognized may be blown away by the air flow. Alternatively, a storage tank for storing water or the like may be also arranged around the information inputting person 10. Furthermore, the storage tank may be circular in shape so that the water or the like may circulate through the storage tank. With a construction such as this, it is also possible to prevent an object which is not the subject to be recognized from remaining around the information inputting person 10.

Figure 17:
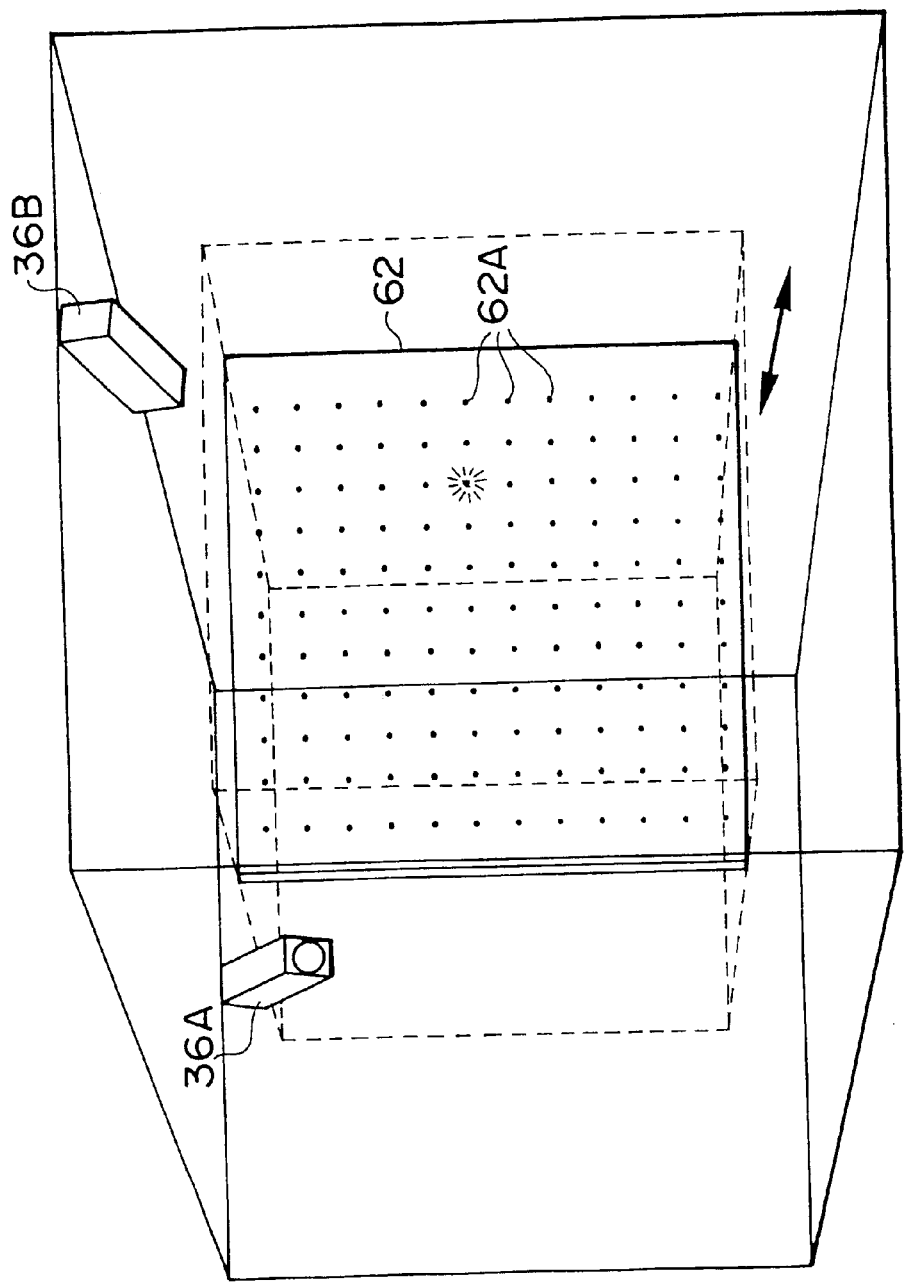
FIG. 17 is a perspective view of the information input space showing another example of the mark plate.

Although, in the above description, the lattice point position information is set by the use of the mark plate 40 composed of many marks 40A which are recorded so that they may be equally spaced in a matrix shape on the transparent flat plate, the present invention is not limited to this example. As shown in FIG. 17, a mark plate 62, in which markers composed of many light emitting devices 62A such as LED are arranged in a matrix shape on the transparent flat plate, may be used.

In this case, in the lattice point position information initialization, one light emitting device 62A at a time is sequentially switched on. Whenever each light emitting device 62A is switched on, the three-dimensional coordinates of the switched-on light emitting device 62A are calculated. An image of the information input space is picked up by the video cameras 36A and 36B. The position of the light emitting device 62A on the images A and B is calculated. The three-dimensional coordinates of the light emitting device 62A are made to correspond to the position of the light emitting device 62A on the images A and B. This correspondence is stored in the memory 24 as the lattice point position information. After all the light emitting devices 62A on the mark plate 62 are switched on, the mark plate 62 is moved by a fixed amount by the mark plate driving unit 38. The above processing has only to be repeated.

Figure 18:
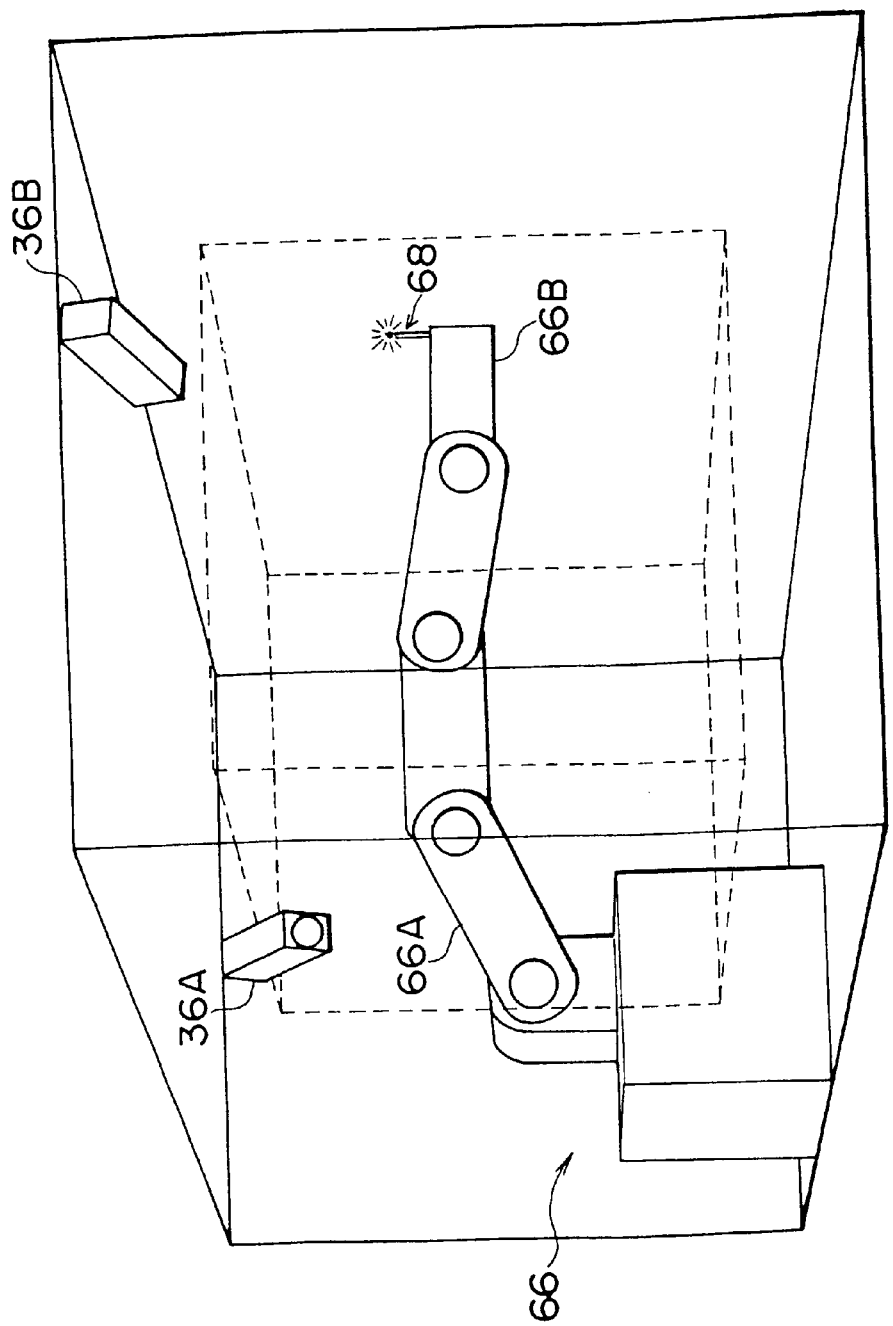
FIG. 18 is a perspective view of the information input space showing an example of a movement of a marker position by a robot arm unit.

As shown in FIG. 18, the mark plate 40 and the mark plate 62 can be replaced by a robot arm unit 66 capable of moving a hand 66B mounted on the end of an arm 66A to an optional position in the information input space in which the marker composed of a light emitting device 68 is attached to the hand 66B. In this case, in the lattice point position information initialization, the light emitting device 68 is switched on, and the light emitting device 68 is moved to the positions corresponding to many lattice points constantly spaced in the lattice arrangement in the information input space. Whenever the light emitting device 68 is positioned in each position, the three-dimensional coordinates of the light emitting device 68 are calculated. The image of the information input space is picked up by the video cameras 36A and 36B. The position of the light emitting device 68 on the images A and B is calculated. The three-dimensional coordinates of the light emitting device 68 are allowed to correspond to the position of the light emitting device 68 on the images A and B. This correspondence has only to be stored in the memory 24 as the lattice point position information.

Furthermore, instead of an automatic positioning of the markers (the marks 40A, the light emitting devices 62A or the light emitting device 68) in the positions corresponding to a multiplicity of lattice points uniformity spaced in the lattice arrangement in the information input space by driving the mark plate 40, the mark plate 62, the robot arm unit 66 or the like as described above, the markers are manually positioned in the positions corresponding to the multiplicity of lattice points by the operator and an image of this situation is picked up, whereby the lattice point position information initialization alone may be automatically performed.

The mark plate shown in FIGS. 17 and 18 can be also applied to the use of at least one video camera and a plurality of illuminators as shown in FIG. 13.

In the instruction determination processing shown in FIGS. 8A and 8B, when the information inputting person 10 does not make the pointing motion (when the negative determination is made in step 159), the coordinates of the position on the display surface of the display 12 pointed at by the information inputting person 10 are not calculated and thus the coordinates are not output to the information processor 14. As a result, when the information inputting person 10 does not make the pointing motion, the cursor or the like is not displayed on the display 12. Therefore, in order to keep the cursor or the like displayed on the display 12, the information inputting person 10 is required to keep pointing to a desired position on which the cursor or the like is displayed. Disadvantageously, this results in a heavy load of the information inputting person 10.

Figure 19:
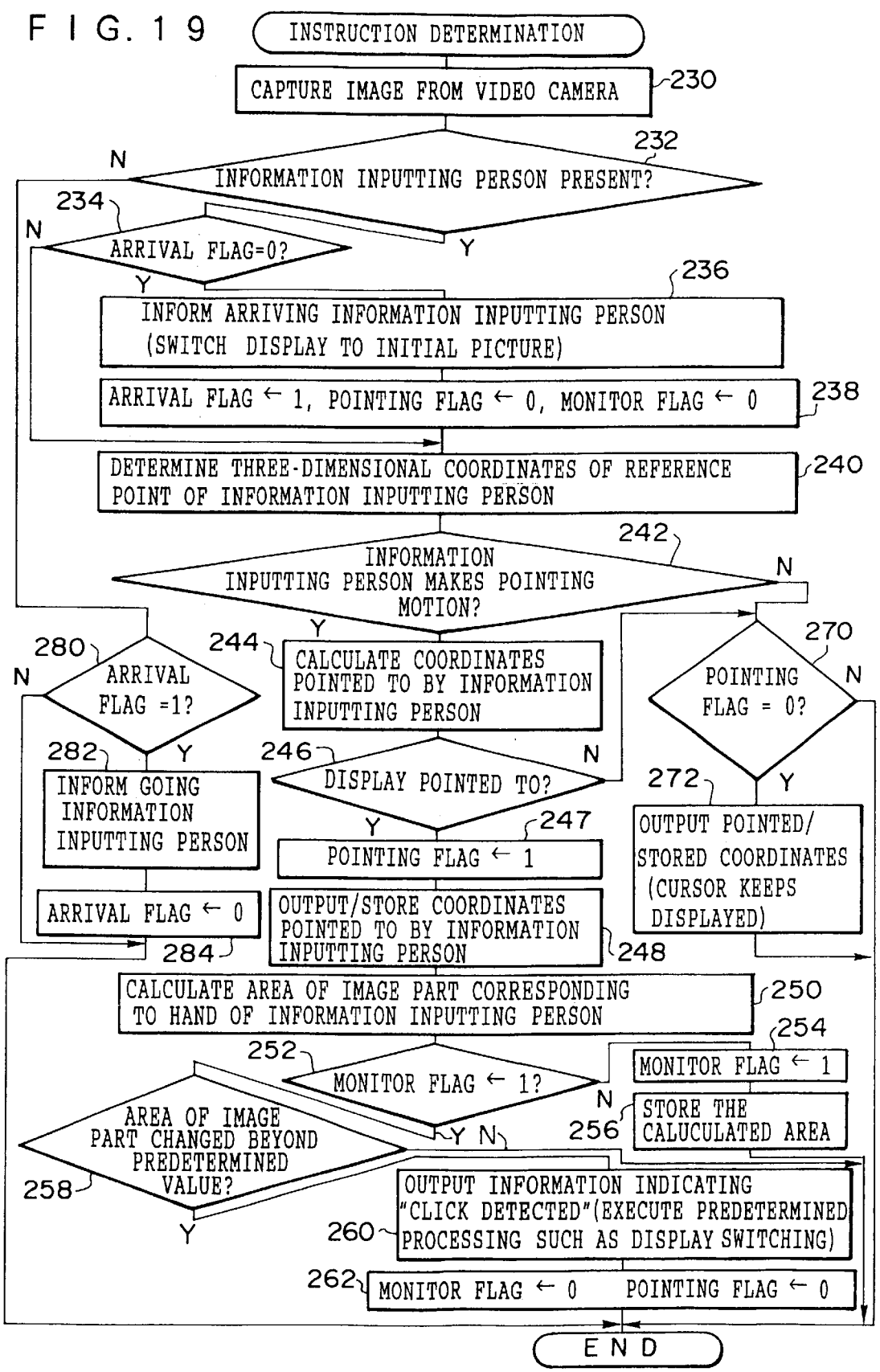
FIG. 19 is a flow chart of another example of the instruction determination processing.

For this reason, the instruction determination processing shown in FIGS. 8A and 8B may be replaced by the instruction determination processing shown in FIG. 19. In this instruction determination processing, in the same manner as steps 150 and 152 in the instruction determination processing of FIGS. 8A and 8B, the image data output from the video cameras 36A and 36B is captured in step 230, and whether or not the information inputting person 10 is present in the information input space is then determined on the basis of the captured image data in next step 232.

If a negative determination is made, the processing proceeds to step 280. In step 280, whether or not an arrival flag (the flag for indicating that the information inputting person 10 has arrived at the information input space) is 1 is determined. Since the initial value of the arrival flag is 0, the negative determination is first made in step 280, so that the instruction determination processing is completed without any processing. When the information inputting person does not arrive at the information input space, a predetermined attraction picture (the picture for attracting passersby near the information input space to the information input space) is displayed on the display 12 by the information processor 14.

On the other hand, when the information inputting person 10 does arrive at the information input space, the affirmative determination is made in step 232, and the processing proceeds to step 234. In step 234, whether or not the arrival flag is 0 is determined. If the affirmative determination is made in step 234, the processing proceeds to step 236. In step 236, the information processor 14 is informed that the information inputting person has arrived at the information input space. Thus, the information processor 14 switches the picture displayed on the display 12 from the attraction picture to an initial picture (for example, for a product advertisement, this may be a picture indicating a product list or the like).

In the next step 238, since the information inputting person has arrived at the information input space, the arrival flag is set at 1, an instruction flag, (the flag for indicating that the information inputting person 10 is pointing to the display surface of the display 12), and the monitor flag are set at 0, and then the processing proceeds to step 240. When a negative determination is made in step 234, namely, when the information inputting person remains in the information input space after the previous execution of the instruction determination processing, the processing proceeds to step 240 without any processing in steps 236 and 238.

In step 240, in the same manner as steps 154 through 158 of the flow chart of FIGS. 8A and 8B, the image parts corresponding to the full-length image of the information inputting person 10 are extracted from the images picked up by the video cameras 36A and 36B, and the height h and the position on the floor surface of the information inputting person 10 are calculated, whereby the three-dimensional coordinates of the reference point of the information inputting person 10 are determined. In next step 242, in the same manner as step 159 of the flow chart of FIGS. 8A and 8B, whether or not the information inputting person 10 is making a pointing motion is determined. If a negative determination is made in step 242, whether or not the instruction flag is 1 is determined in step 270. If a negative determination is also made in step 270, the instruction determination processing is completed.

On the other hand, when the information inputting person 10 changes his/her attitude from an upright standing attitude as shown in FIG. 12A into an attitude of pointing with the hand to the display 12 as shown in FIG. 12B or 12C, an affirmative determination is made in step 242, and then the processing proceeds to step 244. In step 244, in the same manner as steps 160 through 176 of the flow chart of FIGS. 8A and 8B, the three-dimensional coordinates of the feature point of the information inputting person 10 are calculated, and the position pointed to by the information inputting person 10 is then calculated.

In step 246, whether or not the information inputting person 10 points to the display surface of the display 12 is determined. If a negative determination is made in step 246, the processing proceeds to step 270. On the other hand, if an affirmative determination is made in step 246, the pointing flag is set at 1 in step 247. Then, in step 248, the coordinates of the position on the display surface of the display 12 pointed to by the information inputting person 10 is output to the information processor 14 and the coordinates are stored in the RAM 22C or the like. Thus, the information processor 14 allows the cursor or the like to be displayed at the position on the display surface of the display 12 pointed to by the information inputting person 10.

The processing in the steps 250 through 262 is performed in the same manner as steps 184 through 196 of the flow chart of FIGS. 8A and 8B, whereby the click motion is detected. Namely, the image part corresponding to the hand of the information inputting person 10 in the image is extracted so that the area thereof is calculated (step 250), and whether or not the monitor flag is 1 is determined (step 252). If a negative determination is made in step 252, the monitor flag is set at 1 (step 254). The previously calculated area of the image part corresponding to the hand of the information inputting person is stored in the memory (step 256), and the instruction determination processing is completed.

If an affirmative determination is made in step 252, the area calculated in step 250 is compared to the area stored in the RAM 22C or the like, whereby whether or not the area of the image part corresponding to the hand of the information inputting person 10 is changed beyond a predetermined value is determined (step 258). If a negative determination is made in step 258, the determination that the information inputting person 10 is not making a click motion is made, so that the instruction determination processing is completed without any processing. On the other hand, if an affirmative determination is made in step 258, the information indicating "click detected" is output to the information processor 14 (step 260, whereby the information processor 14 executes a predetermined processing such as replacing the picture displayed on the display 12). Then, the monitor flag and the pointing flag are set at 0 (step 262), and the instruction determination processing is completed.

If the information inputting person 10 points to the display surface of the display 12, and then he/she lowers the arm without a click motion, a negative determination is made in step 242 and the processing proceed to step 270. At this time, since the pointing flag is 1, an affirmative determination is made in step 270, and then processing proceeds to step 272. In step 272, the coordinates of the position on the display surface of the display 12 pointed to by the information inputting person 10, (calculated and stored in the RAM 22C in step 248), are output to the information processor 14. Thus, the information processor 14 allows the cursor to remain displayed at the position where the cursor was displayed before the information inputting person 10 lowered the arm.

In the above description, even if the attitude of the information inputting person 10 is changed from the attitude shown in FIG. 12B or 12C into the attitude shown in FIG. 12A, the cursor remains displayed. Thus, even when the information inputting person 10 desires to keep the cursor displayed (for example, during a presentation at a conference), the information inputting person 10 is not required to keep the arm raised. Accordingly, the burden on the information inputting person 10 can be reduced.

If the information inputting person 10 goes out of the information input space, a negative determination is made in step 232 even midway through a series of processing acts by the information processor 14, so that the processing proceeds to step 280. Since the arrival flag is set at 1 when the information inputting person 10 goes out of the information input space, the affirmative determination is made in step 280. In step 282, the information processor 14 is informed that the information inputting person 10 has gone out of the information input space. Thus, if the processing is midway through being executed, the information processor 14 stops the execution of the processing and switches the picture displayed on the display 12 to the attraction picture. In the next step 284, the airmail flag is set at 0, and the instruction determination processing is completed.

In this manner, when an information inputting person 10 is absent from the information input space, an attraction picture is always displayed on the display. Every time the information inputting person 10 comes to the information input space, the information processor 14 performs a series of processing acts starting with displaying the initial picture on the display 12.

Although, in the instruction determination processing shown in FIGS. 8 and 19, the click motion is defined as any motion of the hand of the information inputting person (for example, bending and turning the wrist, bending and extending a finger or the like), the present invention is not limited to these examples. A forward quick motion of the hand of the information inputting person 10 (see FIG. 22A, hereinafter referred to as a "forward click") and a backward quick motion of the hand of the information inputting person 10 (see FIG. 22B, hereinafter referred to as a "backward click") may be defined as the click motion. The above-described click motion can be detected by, for example, the instruction determination processing shown in FIG. 20 instead of the instruction determination processing shown in FIGS. 8 and 19.

Figure 20:
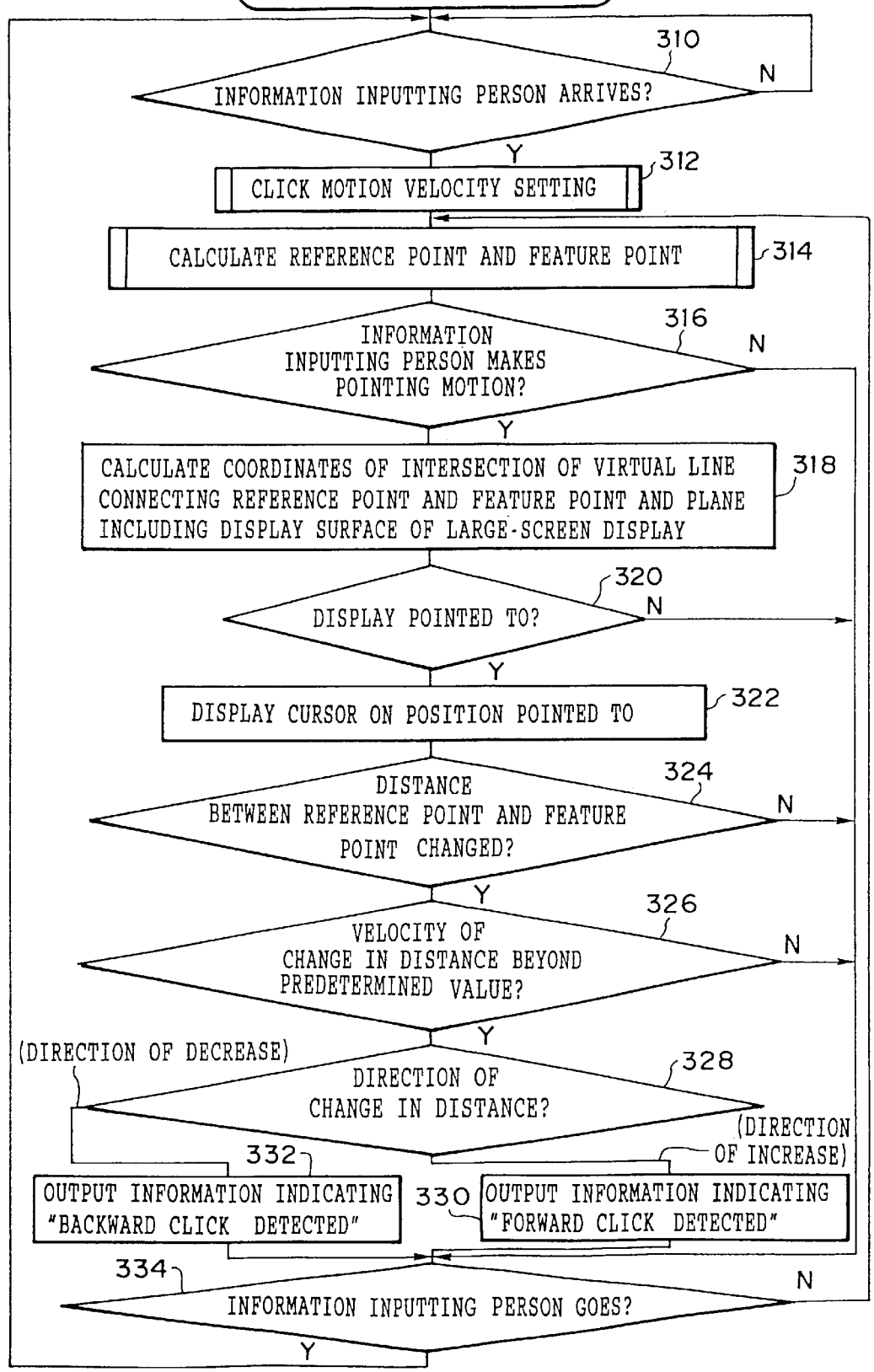
FIG. 20 is a flow chart of a further example of the instruction determination processing.

Namely, in the instruction determination processing shown in FIG. 20, firstly, in step 310, in the same manner as step 152 of the flow chart of FIGS. 8A and 8B and step 232 of the flow chart of FIG. 19, whether or not the information inputting person 10 has arrived at (is present in) the information input space is determined. This determination can also be accomplished by the very simple determination of, for example, whether or not an image part having a high luminance and an area of a predetermined value or more is present in the images A and B. If a negative determination is made in step 310, the processing is delayed until an affirmative determination is made. When the information inputting person 10 arrives at the information input space, an affirmative determination is made in step 310, and then the processing proceeds to step 312. In step 312, a click motion speed setting processing is executed.

This click motion speed setting processing will now be described with reference to the flow chart of FIG. 21. In step 290, the information processor 14 is given an instruction to display on the display 12 a message to request the information inputting person 10 to make the click motion. The information processor 14 allows the massage to be displayed on the display 12. When the massage is displayed on the display 12, the information inputting person 10 bends or extends the arm and repeats the forward click motion or backward click motion.

In the next step 292, a reference point/feature point coordinates calculation processing (the same processing as in steps 154 through 176 of the flow chart of FIGS. 8A and 8B) is performed, whereby the three-dimensional coordinates of the reference point $P_0$ and the feature point $P_X$ are determined. In step 294, whether or not the information inputting person 10 makes a pointing motion to point to the display 12 is determined. If a negative determination is made in step 294, the processing returns to step 292. Steps 292 and 294 are repeated until the information inputting person 10 makes the pointing motion. If an affirmative determination is made in step 294, the processing proceeds to step 296.

In step 296, a distance k between the reference point $P_0$ and the feature point $P_X$ is calculated from the three-dimensional coordinates of the reference point $P_0$, and the three-dimensional coordinate of the feature point $P_X$ which are captured in step 292. Although step 296 is repeated, during the second and later repetitions, the rate of the change of the distance k, that is, a velocity of change V, (a moving speed of the position of the feature point $P_X$ to the reference point $P_0$), is calculated based on the difference between the current value of the distance k and the previous value of the distance k. This calculation result is stored.

In the next step 298, whether or not a predetermined time passes after the message requesting the click motion is displayed on the display 12 is determined. If the negative determination is made in step 298, the processing is returned to step 292, and steps 292 through 298 are repeated. Therefore, until a predetermined time passes after the massage of the request for the click motion is displayed, the calculation and storage of the velocity of change V of the distance k between the reference point $P_0$ and the feature point $P_X$ are repeated.

If an affirmative determination is made in step 298, the processing proceeds to step 300. The previously calculated and stored velocity of change V is captured, and a click motion speed $V_0$ is set and stored as the threshold value, based on the transition of the velocity of change V during a single click motion of the information inputting person 10. This click motion speed $V_0$ is used as the threshold value for determining whether or not the information inputting person 10 is making the click motion in the processing described below. Thus, in order to determine with certainty that the information inputting person 10 is making a click motion, a click motion speed $V_0$ can be set at, for example, a value which is slightly smaller than the average value of the velocity of change V during a single click motion of the information inputting person 10. Alternatively, the click motion speed $V_0$ may be set at a minimum value of the velocity of change V during a single click motion of the information inputting person 10.

When the information inputting person 10 bends or extends an arm so as to thereby make the click motion, the moving speed (the velocity of change V) of the feature point $P_X$ varies depending on the information inputting person 10. However, the above-described click motion speed setting processing is executed every time an information inputting person 10 arrives at the information input space. Therefore, when a new information inputting person 10 arrives at the information input space, an appropriate new value is set as the click motion speed $V_0$ in response to the physique, muscular strength, or the like of the new information inputting person 10.

When the above-described click motion speed setting processing is completed, the processing proceeds to step 314 of the instruction determination processing (FIG. 20). In step 314, the reference point/feature point coordinates calculation processing (the same processing as in steps 154 through 176 of the flow chart of FIGS. 8A and 8B) is performed, whereby the three-dimensional coordinates of the reference point $P_0$ and the feature point $P_X$ are determined. In the next step 316, whether or not the information inputting person 10 is making the pointing motion is determined based on the three-dimensional coordinates of the reference point $P_0$ and the feature point $P_X$ determined in step 314.

If a negative determination is made in step 316, the processing proceeds to step 334. In step 334, whether or not the information inputting person 10 has left the information input space is determined. In the same manner as step 310 described above, this determination can also be accomplished by the very simple determination of, for example, whether or not the image part having a high luminance and an area of a predetermined value or more is absent from the images A and B. If a negative determination is made, the processing returns to step 314. Steps 314, 316 and 334 are repeated until the information inputting person 10 makes the pointing motion, steps 314, 316, 334 are repeated.

If an affirmative determination is made in step 316, the processing proceeds to step 318. In step 318, based on the three-dimensional coordinates of the reference point $P_0$ and the feature point $P_X$ calculated in step 314, in the same manner as step 176 of the flow chart of FIGS. 8A and 8B, in order to determine the position pointed to by the information inputting person 10, the coordinate of the intersection point on a the plane including the display surface of the large-screen display 12, and the virtual line connecting the reference point and the feature point, are calculated. In the next step 320, whether or not the information inputting person 10 points to the display surface of the large-screen display 12 is determined based on the coordinate calculated in step 318.

If a negative determination is made in step 320, the processing proceeds to step 334 without any processing. On the other hand, if an affirmative determination is made in step 320, in step 322, the coordinates calculated in step 318 are output to the information processor 14, whereby the information processor 14 is given the instruction to display the cursor. Thus, the information processor 14 performs the processing allowing the cursor to be displayed on a predetermined position, which is judged to be the position pointed to by the information inputting person 10, on the display surface of the display 12.

In the next step 324, the distance k between the reference point $P_0$ and the feature point $P_X$ is calculated based on the three-dimensional coordinates of the reference point $P_0$ and the feature point $P_X$ and whether or not the distance k is changed is determined. Step 324 is repeated, when the information inputting person 10 points to the display surface of the display 12 (when an affirmative determination is made in step 320). Since whether or not the distance k is changed cannot be determined when the distance k is calculated for the first time in step 324, a negative determination is unconditionally made in step 324.

On the other hand, if a affirmative determination is made in step 324, the processing proceeds to step 326. In step 326, the velocity of the change V of the distance k is calculated, and whether or not the calculated velocity of change V is the threshold value, (the click motion velocity $V_0$ set by the click motion velocity setting processing), or more is determined. In step 326, since the velocity of change V of the distance k cannot be determined when the distance k is calculated for the first time in step 324, a negative determination is unconditionally made. If a negative determination is made in step 324 or 326, the determination that the information inputting person 10 is not making a click motion is made, and the processing proceeds to step 334 without any processing.

If an affirmative determination is made in step 324 or 326, the determination that the information inputting person 10 is making a click motion is made. In step 328, the direction of the change in the distance k is determined, and the processing branches in response to the result of the determination. When the distance k is changed in a direction of increase, since it can be determined that the information inputting person 10 is making the forward click motion by quickly extending an arm, the processing proceeds to step 330. In step 330, the information indicating that the forward click has been detected is output to the information processor 14, and then the processing proceeds to step 334. On the other hand, when the distance k is changed in a direction of reduction, since it can be determined that the information inputting person 10 is making the backward click motion by quickly bending the arm, the processing proceeds to step 332. In step 332, the information indicating that the backward click has been detected is output to the information processor 14, and then the processing proceeds to step 334.

When the information indicating that the forward or backward click has been detected is input to the information processor 14, the information processor 14 determines that the current position pointed to by the information inputting person 10 is clicked. If the forward click is detected, a first processing corresponding to the current position pointed to is performed. If the backward click is detected, a second processing (differing from the first processing) corresponding to the current position pointed to is performed. When the information inputting person 10 goes out of the information input space, an affirmative determination is made in step 334, and the processing returns to step 310.

Since the click motion in the instruction determination processing is a very natural motion as the motion for pointing to and selecting a specific position on the display surface of the display 12, the person to be recognized can make the click motion without feeling uncomfortable. Moreover, in the above description, since whether or not the click motion is performed, and whether the performed click motion is the forward click motion or the backward click motion, can be determined on the basis of the change in the distance k between the reference point and the feature point, the click motion can be detected in a short time. Since two types of click motion, (the forward click motion and the backward click motion), are also defined as the click motion, the information inputting person can selectively execute the first processing and the second processing.

The natural movement of a persons hand after performing the forward click motion or the backward click motion, is to try to return to the position (neutral position) prior to the click motion. Therefore, in order to prevent the motion of the hand trying to return to the neutral position after the forward click motion from being mistaken as the backward click motion, and to prevent the motion of the hand trying to return to the neutral position after the backward click motion from being mistaken as the forward click motion, it is desirable that the motion of the hand trying to return to the neutral position is ignored after detecting the forward or backward click motion. This can be accomplished by, for example, stopping a detection of the click motion for a predetermined time after detecting the forward or backward click motion. Alternatively, this can be also accomplished in the following manner. That is, the value of the distance k before detecting the forward or backward click motion is previously stored as the value corresponding to the neutral position. Then, the detection of the click motion is stopped until the value of the distance k reaches the value corresponding to the neutral position after the forward or backward click motion is detected.

For the above-mentioned instruction determination processing, in the same manner as the instruction determination processing shown in FIG. 19, when the information inputting person lowers the arm, then needless to say, the cursor may remain displayed at the position on which the cursor was displayed before the arm was lowered.

Figure 23:
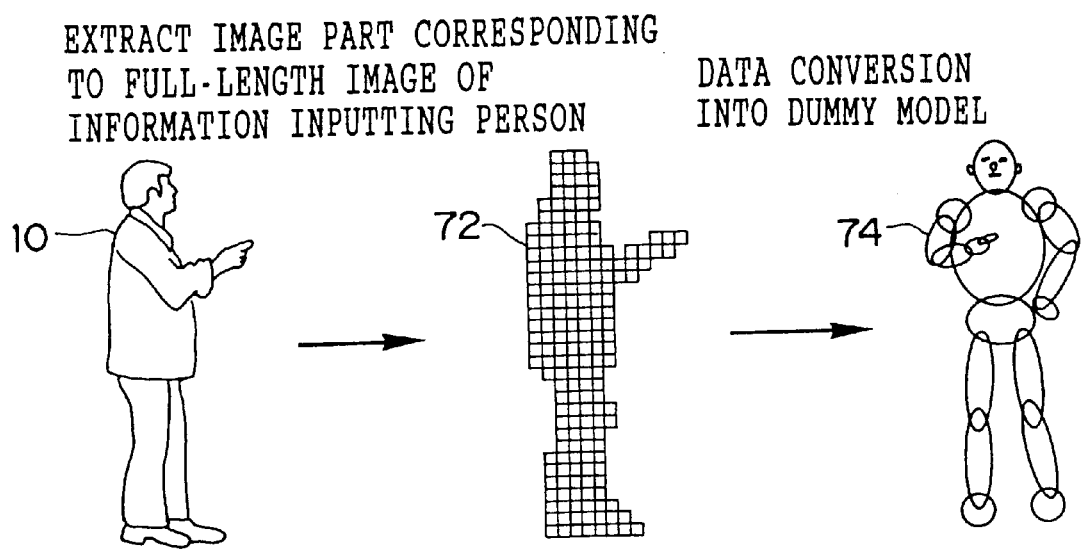
FIG. 23 is an image illustration for describing a data conversion into a dummy model.

Although, in the above description, the position pointed to by the information inputting person is calculated on the basis of the three-dimensional coordinates of the reference point and the feature point of the information inputting person, the present invention is not limited to this example. As shown in FIG. 23, an image part 72 corresponding to the full-length image of the information inputting person 10 is extracted from the image picked up by the video camera, and the height h and the position on the floor surface of the information inputting person 10 are calculated. Furthermore, after other parameters concerning the information inputting person 10 such as their shape have been determined, the full-length image of the information inputting person is converted into a dummy model 74 on the basis of various parameters including their height h. Various motions of the information inputting person including the motion to point to the display surface of the display 12 may be recognized on the basis of this dummy model.

As described above, when the dummy model is used, it is also possible to recognize a motion such as a motion waving the hand which is difficult to recognize from the full-length image of the information inputting person. For example, assuming that the motion, in which the information inputting person waves the hand, is defined as the motion indicating "cancel", when the information inputting person waves the hand, it is possible to stop the processing executed in response to the previously recognized motion of the information inputting person.

Although the above description is provided for an example of a mode in which the information inputting person points to an optional point on the display surface of the display, the subject to be pointed to by the information inputting person is not limited to the display. The information inputting person may point to an optional direction or to an optional object positioned at an unfixed distance from the information inputting person.

When the information inputting person points to an optional direction, in the instruction determination processing (for example, in step 176 of the flow chart of FIGS. 8A and 8B), the direction in which of the virtual line connecting the reference point and the feature point of the information inputting person extends is determined, whereby the direction pointed to by the information inputting person can be determined. When the information inputting person points to an optional object positioned at an unfixed distance from the information inputting person, in the previous step 176, the extending direction of the virtual line is determined, and then the object on the end of the extending virtual line is determined, whereby the direction pointed to by the information inputting person can be determined.

The information inputting person may point to an optional direction in the following application. For example, in a theater or the like, the direction of emission of a spot light, and the directions of acoustic beams generated by a multiplicity of speakers in an array arrangement might be oriented to the direction pointed to by the operator (information inputting person).

The information inputting person may point to an optional object positioned at an unfixed distance from the information inputting person in the following application. For example, on a building site, a factory, or the like, a crane and other machines might operated in response to instructions from the operator (information inputting person). Furthermore, the information inputting person might give various instructions to various devices in home automation.

Although, in the above main description, a single video camera 36 or two video cameras 36A and 36B are mainly provided, the present invention is not limited to this example. The image of the information input space may be picked up by more video cameras whereby the instruction from the information inputting person is determined.

What is claimed is:

1. A hand pointing apparatus comprising:
   an illuminating device for illuminating a person to recognized;
   a plurality of image pickup devices, each of which picks up said person to be recognized, located in different positions, wherein said illuminating device and said plurality of image pickup devices are adjusted such that said person to be recognized, who is illuminated by said illuminating device, is within each of image pickup ranges corresponding to a respective one of said plurality of image pickup devices, and an illuminated range on a floor surface, which is illuminated by said illuminating device, is out of the pickup range of each of the image pickup ranges; and
   a determiner for determining one of a position or a direction pointed to by said person to be recognized on the basis of a plurality of images of situation picked up by said plurality of image pickup devices, the situation being indicative of said person to be recognized pointing to one of the position or the direction, by extracting an image part corresponding to said person to be recognized from the plurality of images.

2. A hand pointing apparatus according to claim 1, further comprising:
   a preventer for preventing an object which is not a subject to be recognized from remaining on the floor surface around said person to be recognized.

3. A hand pointing apparatus comprising:
   a plurality of illuminating devices for illuminating a person to be recognized form different directions;
   a plurality of image pickup devices located in different positions,
   a controller for switching on/off said plurality of illuminating devices one by one in sequence, and for effecting control such that an image of said person to be recognized pointing to one of a position or a direction, which person is illuminated by a switched-on illuminating device among said plurality of illuminating devices, is picked up; and
   a determiner for determining one of the position or the direction pointed to by said person to be recognized, on the basis of a plurality of images picked up by said plurality of image pickup devices, by extracting an image part corresponding to said person to be recognized from the plurality of images,
   wherein, each of said plurality of illuminating devices has an illuminated range on a floor surface in which said person to be recognized exists,
   each of said plurality of image pickup devices has an image pickup range,
   each of said plurality of illuminating devices corresponds to a respective one of said plurality of image pickup devices,
   an illuminating device illuminates said person to be recognized, and the illuminating device and an image pickup device corresponding to the illuminating device are adjusted such that
   said person to be recognized, who is illuminated by the illuminating device, is within an image pickup range of the image pickup device, corresponding to the illuminating device, and
   an illuminated range on the floor surface of the illuminating device is out of the pickup range of the image pickup device corresponding to the illuminating device.

4. A hand pointing apparatus according to claim 3, further comprising:
   a preventer for preventing an object which is not a subject to be recognized from remaining on the floor surface around said person to be recognized.

5. A hand pointing apparatus according to claim 3, wherein said plurality of illuminating devices include at least a first illuminating device and a second illuminating device and plurality of image pickup devices include at least a first image pickup device and a second image pickup device, said first illuminating device corresponds to said first image pickup device and said second illuminating device corresponds to said second image pickup device, said first illuminating device and said first image pickup device are adjusted such that said person to be recognized, who is illuminated by said first illuminating device is within an image pickup range of said first image pickup device, and an illuminated range on a floor surface of said first illuminating device is out of the image pickup range of said first image pickup device, said second illuminating device and said second image pickup device are adjusted such that said person to be recognized, who is illuminated by said second illuminating device is within an image pickup range of said second image pickup device, and an illuminated range on the floor surface of said second illuminating device is out of the image pickup range of said second image pickup device.

6. A hand pointing apparatus comprising:
   a plurality of illuminating devices for illuminating a person to be recognized from different directions;
   at least one image pickup device for picking up an image of said person to be recognized, who is illuminated by said illuminating device;
   a discriminator for switching on/off said plurality of illuminating devices one by one in sequence, for comparing a plurality of images of said person to be recognized pointing to one of a position or a direction picked up by said at least one image pickup devices, each of said plurality of images being picked up during respective said plurality of illuminating devices are switched on, and for discriminating between an image part corresponding to said person to be recognized and an image part other than the image part corresponding to said person to be recognized, from said plurality of images, for said at least one image pickup device; and
   a determiner for extracting the image part corresponding to said person to be recognized from said plurality of images picked up by said at least one image pickup device based on a result of a discrimination by said discriminator, and for determining one of the position or the direction pointed to by said person to be recognized, wherein said discriminator generates image data, on the basis of a predetermined condition, from said plurality of images, and on the basis of the image data, said discriminator discriminates between the image part corresponding to said person to be recognized and the image part other than the image part corresponding to said person to be recognized, said discriminator switches on/off said plurality of illuminating devices such that, during a predetermined period, the image part corresponding to said person to be recognized has higher luminance than that of the image part other than the image part corresponding to said person to be recognized due to said plurality of illuminating devices that are switched on during said predetermined period, and wherein an illuminated range on the floor surface of each of the plurality of illuminating devices is different from one another.

7. A hand pointing apparatus according to claim 6, further comprising:
a preventer for preventing an object which is not a subject to be recognized from remaining on the floor surface around said person to be recognized.

8. A hand pointing apparatus comprising:
an illuminating device for illuminating a person to be recognized who arrives at a predetermined region;
a plurality of image pickup devices for picking up an image of said person to be recognized, who is illuminated by said illuminating device, from different directions;
a positioner for positioning, beginning at a start position and ending at a termination position, a plurality of points in a plane in said predetermined region, wherein said positioner successively positions said plane at different positions in said predetermined region, wherein successive positions are located at a fixed distance from each other;
storage for storing information for corresponding three-dimensional coordinates of the plurality of points, positioned within said predetermined region, to two-dimensional coordinates of said plurality of points which the two-dimensional coordinates are in said plurality of images picked up by said plurality of image pickup devices; and
a determiner for extracting an image part corresponding to said person to be recognized from a plurality of images based on a plurality of images of situations picked up by said plurality of image pickup devices, the situations being indicative of said person to be recognized pointing to one of a position or a direction; for determining the two-dimensional coordinates of a feature point of said person to be recognized in each of said images; for determining the three-dimensional coordinates of the feature point based on the determined two-dimensional coordinates of the feature point and the information stored in said storage; and for determining one of the position or the direction pointed to by said person to be recognized based on the determined three-dimensional coordinates of the feature point.

9. A hand pointing apparatus according to claim 8, further comprising:

a preventer for preventing an object which is not a subject to be recognized from remaining on the floor surface around said person to be recognized.

10. A hand pointing apparatus according to claim 8, wherein said determiner determines the two-dimensional coordinates of the feature point of said person to be recognized in said images, extracts from said images the points positioned in a region within a predetermined range including said feature point on said images from said images, and determines the three-dimensional coordinates of said feature point on the three-dimensional coordinated of the common points extracted from said images.

11. A hand pointing apparatus according to claim 8, further comprising:
a generator for allowing said plurality of image pickup devices to pick up images of the situations where markers are positioned in the two-dimensional coordinates of said points, for generating the information for corresponding the three-dimensional coordinates of said points to the two-dimensional coordinates of said points on said images, based on the three-dimensional coordinates of said points and the marker positions on said images picked up by said plurality of image pickup devices, and for allowing said storage to store the generated information.

12. A hand pointing apparatus comprising:
an illuminating device for illuminating a person to be recognized;
a plurality of image pickup devices for picking up images of said person to be recognized, who is illuminated by said illuminated device, from different directions;
a determiner for extracting an image part corresponding to said person to be recognized from a plurality of images based on a plurality of images of situations picked up by said plurality of image pickup devices, the situations being indicative of said person to be recognized pointing to one of a position or a direction, and for determining one of the position or the direction pointed to by said person to be recognized;
a first detector (1) for extracting, from said plurality of images, the image part corresponding to a predetermined part of a body of said person to be recognized, and calculating at least one of an area of the extracted image part and outline of the extracted image part and a length of an outline of the extracted image part so as to obtain a first calculation value, (2) after a predetermined time elapses for extracting from said plurality of images, the image part corresponding to the predetermined part of the body of said person to be recognized and calculating the at least one of an area of the extracted image part, and outline of the extracted image part and a length of an outline of the extracted image part so as to obtain a second calculation value and (3) detecting a changed value between the first calculation value and the second calculation value; and
a processor for executing a predetermined processing when the changed value detected by said first detector is more than or equal to a predetermined changed value.

13. A hand pointing apparatus according to claim 12, further comprising:
a second detector for extracting the image part corresponding to the arm of said person to be recognized from said plurality of images, and for detecting whether or not the arm of said person to be recognized is lowered,
wherein said processor continues the current state when said second detecting means detects that the arm of said person to be recognized is lowered.

14. A hand pointing apparatus according to claim 12, further comprising:
   a preventer for preventing an object which is not a subject to be recognized from remaining on the floor surface around said person to be recognized.

15. A hand pointing apparatus comprising:
   an illuminating device for illuminating a person to be recognized;
   a plurality of image pickup devices for picking up images of said person to be recognized, who is illuminated by said illuminating device from different directions;
   a determiner for extracting an image part corresponding to said person to be recognized from a plurality of images based on a plurality of images of situations picked up by said plurality of image pickup devices, the situations being indicative of said person to be recognized pointing to either a specific position or a specific direction, for determining the three-dimensional coordinates of the feature point whose position is changed when said person to be recognized bends or extends an arm, and the three-dimensional coordinates of a reference point whose position is not changed even if said person to be recognized bends and extends an arm, and for determining either the position or the direction pointed to by said person to be recognized based on the three-dimensional coordinates of the feature point and the three-dimensional coordinates of the reference point; and
   a processor for calculating the distance between said reference point and said feature point and for executing a predetermined processing based on the change in the distance between said reference point and said feature point.

16. A hand pointing apparatus according to claim 15, wherein said processor performs a first predetermined processing when the distance between said reference point and said feature point is increased, and performs a second predetermined processing differing from said first predetermined processing when the distance between said reference point and said feature point is reduced.

17. A hand pointing apparatus according to claim 15, wherein said processor detects a rate of change in the distance between said reference point and said feature point, and executes a predetermined processing when the detected rate of change is a threshold value or more.

18. A hand pointing apparatus according to claim 16, wherein said processor detects a rate of change in the distance between said reference point and said feature point, and executes a predetermined processing when the detected rate of change is a threshold value or more.

19. A hand pointing apparatus according to claim 17, further comprising:
   a threshold value setter for requesting said person to be recognized to bend or extend an arm in order to allow said processor to perform a predetermined processing, and for setting said threshold value based on the rate of the change in the distance between said reference point and said feature point when said person to be recognized bends or extends an arm.

20. A hand pointing apparatus according to claim 18, further comprising:
   a threshold value setter for requesting said person to be recognized to bend or extend an arm in order to allow said processing means to perform a predetermined processing, and for setting said threshold value based on the rate of the change in the distance between said reference point and said feature point when said person to be recognized bends or extends an arm.

21. A hand pointing apparatus according to claim 15, further comprising:
   a second detector for extracting the image part corresponding to the arm of said person to be recognized from said plurality of images, and for detecting whether or not the arm of said person to be recognized is lowered,
   wherein said processor continues the current state when said second detector detects that the arm of said person to be recognized is lowered.

22. A hand pointing apparatus according to claim 15, further comprising:
   a preventer for preventing an object which is not a subject to be recognized from remaining on the floor surface around said person to be recognized.

23. A hand pointing apparatus comprising:
   illuminating means for illuminating a person to be recognized;
   pickup means for picking up images of said person to be recognized, who is illuminated by said illuminating means;
   determining means for extracting an image part corresponding to said person to be recognized from a plurality of images based on a plurality of images of situations picked up by said image pickup means, the situations being that a member relating to said person to be recognized is moved; and
   processing means for executing a predetermined processing when said member is moved with a predetermined condition.

24. A hand pointing apparatus according to claim 23, wherein said predetermined condition is such that said member is moved more than a predetermined speed.

25. A hand pointing apparatus according to claim 23, wherein said member is a hand of said person to be recognized.

* * * * *